United States Patent
Hendry et al.

(10) Patent No.: US 12,323,597 B2
(45) Date of Patent: Jun. 3, 2025

(54) METHOD AND DEVICE FOR PROCESSING REFERENCE OF PARAMETER SET WITHIN SINGLE LAYER BITSTREAM IN IMAGE/VIDEO CODING SYSTEM

(71) Applicant: LG Electronics Inc., Seoul (KR)

(72) Inventors: Hendry Hendry, Seoul (KR); Seunghwan Kim, Seoul (KR); Seethal Paluri, Seoul (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 17/924,536

(22) PCT Filed: May 11, 2021

(86) PCT No.: PCT/KR2021/005896
§ 371 (c)(1),
(2) Date: Nov. 10, 2022

(87) PCT Pub. No.: WO2021/230629
PCT Pub. Date: Nov. 18, 2021

(65) Prior Publication Data
US 2023/0179770 A1    Jun. 8, 2023

Related U.S. Application Data

(60) Provisional application No. 63/023,795, filed on May 12, 2020, provisional application No. 63/023,827, filed on May 12, 2020.

(51) Int. Cl.
*H04N 19/132* (2014.01)
*H04N 19/159* (2014.01)
(Continued)

(52) U.S. Cl.
CPC ......... *H04N 19/132* (2014.11); *H04N 19/159* (2014.11); *H04N 19/176* (2014.11); *H04N 19/188* (2014.11); *H04N 19/70* (2014.11)

(58) Field of Classification Search
None
See application file for complete search history.

(56) References Cited

U.S. PATENT DOCUMENTS

2023/0027478 A1* 1/2023 Deng .................. H04N 19/117
2023/0043717 A1* 2/2023 Deng .................. H04N 19/186

FOREIGN PATENT DOCUMENTS

| KR | 101812615 | 12/2017 |
|---|---|---|
| KR | 101931719 | 12/2018 |
| KR | 102069416 | 1/2020 |

OTHER PUBLICATIONS

Bross et al., "Versatile Video Coding (Draft 9)," Joint Video Experts Team (JVET) of ITU-T SG 16 WP 3 and ISO/IEC JTC 1/SC 29/WG 11, Document: JVET-R2001-v8, 18th Meeting: by teleconference, Apr. 15-24, 2020, 524 pages.

(Continued)

*Primary Examiner* — Xiaolan Xu
(74) *Attorney, Agent, or Firm* — Fish & Richardson P.C.

(57) ABSTRACT

A method by which a video decoding device decodes a video, according to the present document, comprises the steps of: acquiring, from a bitstream, image information including video coding layer (VCL) network abstraction layer (NAL) units; performing inter prediction or intra prediction on the current block within the current picture on the basis of the image information to generate prediction samples about the current block; and restoring the current block on the basis of the prediction samples, wherein the image information includes an sps_video_parameter_set_id syntax element indicating the value of an identifier of a video parameter set, and, on the basis of that the value of the sps_video_parameter_set_id syntax element is 1, the value of the entire output layer set (OLS) number and the value of (Continued)

the number of layers within the OLS, specified by the video parameter set can be derived to be 1.

16 Claims, 13 Drawing Sheets

(51) Int. Cl.
*H04N 19/169* (2014.01)
*H04N 19/176* (2014.01)
*H04N 19/70* (2014.01)

(56) References Cited

OTHER PUBLICATIONS

Hannuksela et al., "AHG8/AHG17: Removing dependencies on VPS from the decoding process of a non-scalable bitstream," Joint Video Experts Team (JVET) of ITU-T SG 16 WP 3 and ISO/IEC JTC 1/SC 29/WG 11, Document: JVET-P0097, 16th Meeting: Geneva, CH, Oct. 1-11, 2019, 5 pages.

Office Action in Chinese Appln. No. 202180034840.8, mailed on Sep. 27, 2024, 9 pages.

Hendry et al., "AHG9: On constraints and inference values when VPS is not present," JVET-S0075, Joint Video Experts Team (JVET) of ITU-T SG 16 WP 3 and ISO/IEC JTC 1/SC 29/WG 11, 19th Meeting: by teleconference, Jun. 22-Jul. 1, 2020, 2 pages.

* cited by examiner

METHOD AND DEVICE FOR PROCESSING REFERENCE OF PARAMETER SET WITHIN SINGLE LAYER BITSTREAM IN IMAGE/VIDEO CODING SYSTEM

CROSS-REFERENCE TO RELATED APPLICATIONS

This application is a National Stage application under 35 U.S.C. § 371 of International Application No. PCT/KR2021/005896, filed on May 11, 2021, which claims the benefit of U.S. Provisional Application No. 63/023,795, filed on May 12, 2020, and 63/023,827, filed on May 12, 2020. The disclosures of the prior applications are hereby incorporated by reference herein in their entirety.

BACKGROUND OF THE DISCLOSURE

Field of the Disclosure

The present disclosure relates to a method and apparatus for handling reference of a parameter set within a single-layer bitstream, when encoding/decoding image/video information in an image/video coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY OF THE DISCLOSURE

Technical Objects

A technical object of the present disclosure is to provide a method and apparatus for increasing coding efficiency of an image/video.

Another technical object of the present disclosure is to provide a method and apparatus for efficiently handling a single-layer bitstream.

Yet another technical object of the present disclosure is to provide a method and apparatus for deriving a layer identifier of a parameter set that is referred to by VCL NAL units, when a bitstream is a single-layer bitstream.

Yet another technical object of the present disclosure is to provide a method and apparatus for deriving information on an output layer set, when a bitstream is a single-layer bitstream.

Technical Solutions

According to an embodiment of the present specification, provided herein is a video decoding method performed by a video decoding apparatus. The method may include the steps of obtaining image information including video coding layer (VCL) network abstraction layer (NAL) units from a bitstream, generating prediction samples for the current block by performing inter prediction or intra prediction for a current block within a current picture based on the image information and, and reconstructing the current block based on the prediction samples, wherein the image information may include an sps_video_parameter_set_id syntax element indicating an identifier value of a video parameter set, and wherein, based on a value of the sps_video_parameter_set_id syntax element being equal to 0, a value of a total number of output layer sets (OLSs) that are specified by the video parameter set and a value of a number of layers within an OLS may be inferred to be equal to 1.

According to another embodiment of the present specification, provided herein is a video encoding method performed by a video encoding apparatus. The method may include the steps of performing inter prediction or intra prediction for a current block within a current picture, generating prediction information for the current block based on the inter prediction or intra prediction, and encoding image information including the prediction information, wherein the image information may include video coding layer (VCL) network abstraction layer (NAL) units and an sps_video_parameter_set_id syntax element indicating an identifier value of a video parameter set, and wherein, based on a value of the sps_video_parameter_set_id syntax element being equal to 0, a value of a total number of output layer sets (OLSs) that are specified by the video parameter set and a value of a number of layers within an OLS may be inferred to be equal to 1.

According to yet another embodiment of the present specification, provided herein is a computer readable digital recording medium having information stored therein that causes a video decoding method to be performed by a video decoding apparatus, wherein the video decoding method may include the steps of obtaining image information including video coding layer (VCL) network abstraction layer (NAL) units, generating prediction samples for the current block by performing inter prediction or intra prediction for a current block within a current picture based on the image information, and reconstructing the current block based on the prediction samples, wherein the image information may include an sps_video_parameter_set_id syntax element indicating an identifier value of a video parameter set, and wherein, based on a value of the sps_video_parameter_set_id syntax element being equal to 0, a value of a total number of output layer sets (OLSs) that are specified by the video parameter set and a value of a number of layers within an OLS may be inferred to be equal to 1.

Effects of the Disclosure

According to an embodiment of the present disclosure, overall compression efficiency of an image/video may be enhanced.

According to an embodiment of the present disclosure, a single-layer bitstream may be efficiently handled.

According to an embodiment of the present disclosure, when a bitstream is a single-layer bitstream, a layer identifier of a parameter set that is referred to by VCL NAL units may be derived.

According to an embodiment of the present disclosure, constraint corresponding to a single-layer bitstream may be provided.

According to an embodiment of the present disclosure, even when a bitstream is a single-layer bitstream that does not include a video a parameter set, information on an output layer set may be derived.

DESCRIPTION OF EXEMPLARY EMBODIMENTS

Figure 1:
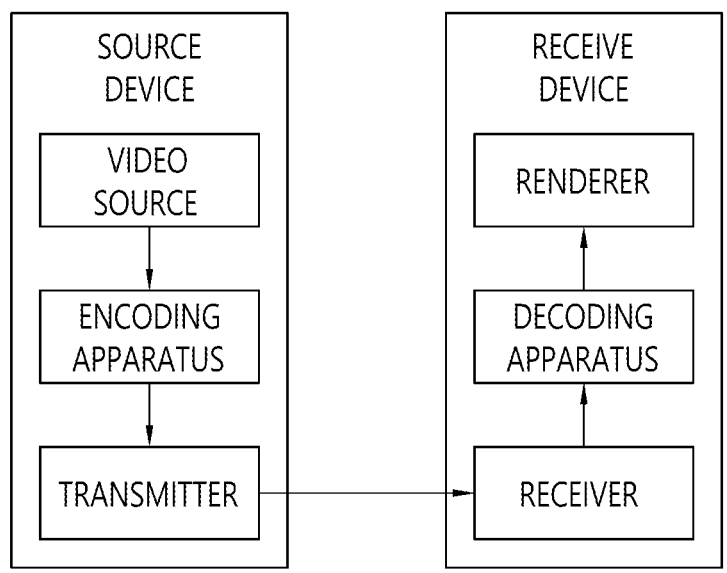
FIG. 1 schematically illustrates an example of a video/image coding system to which embodiments of the present document are applicable.

The disclosure of the present document may be modified in various forms, and specific embodiments thereof will be described and illustrated in the drawings. The terms used in the present document are used to merely describe specific embodiments, but are not intended to limit the disclosed method in the present document. An expression of a singular number includes an expression of 'at least one', so long as it is clearly read differently. The terms such as "include" and "have" are intended to indicate that features, numbers, steps, operations, elements, components, or combinations thereof used in the document exist and it should be thus understood that the possibility of existence or addition of one or more different features, numbers, steps, operations, elements, components, or combinations thereof is not excluded.

The present document relates to video/image coding. For example, a method/embodiment disclosed in the present document may be applied to a method disclosed in a versatile video coding (VVC) standard. In addition, the method/embodiment disclosed in the present document may be applied to a method disclosed in an essential video coding (EVC) standard, AOMedia Video 1 (AV1) standard, 2nd generation of audio video coding standard (AVS2), or a next-generation video/image coding standard (e.g., H.267, H.268, etc.).

Various embodiments related to video/image coding are presented in the present document, and the embodiments may be combined with each other unless otherwise stated.

In addition, each configuration of the drawings described in the present document is an independent illustration for explaining functions as features that are different from each other, and does not mean that each configuration is implemented by mutually different hardware or different software. For example, two or more of the configurations may be combined to form one configuration, and one configuration may also be divided into multiple configurations. Without departing from the gist of the disclosed method of the present document, embodiments in which configurations are combined and/or separated are included in the scope of the disclosure of the present document.

In the present document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present document should be interpreted to indicate "additionally or alternatively."

Further, the parentheses used in the present document may mean "for example". Specifically, in case that "prediction (intra prediction)" is expressed, it may be indicated that "intra prediction" is proposed as an example of "prediction". In other words, the term "prediction" in the present document is not limited to "intra prediction", and "intra prediction" is proposed as an example of "prediction". Further, even in case that "prediction (i.e., intra prediction)" is expressed, it may be indicated that "intra prediction" is proposed as an example of "prediction".

In the present document, technical features individually explained in one drawing may be individually implemented or simultaneously implemented.

Hereinafter, embodiments of the present document will be described in detail with reference to the accompanying drawings. In addition, like reference numerals are used to indicate like elements throughout the drawings, and the same descriptions on the like elements may be omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture). A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture). A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, tile group and slice may be used interchangeably. For example, in the present document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

Figure 2:
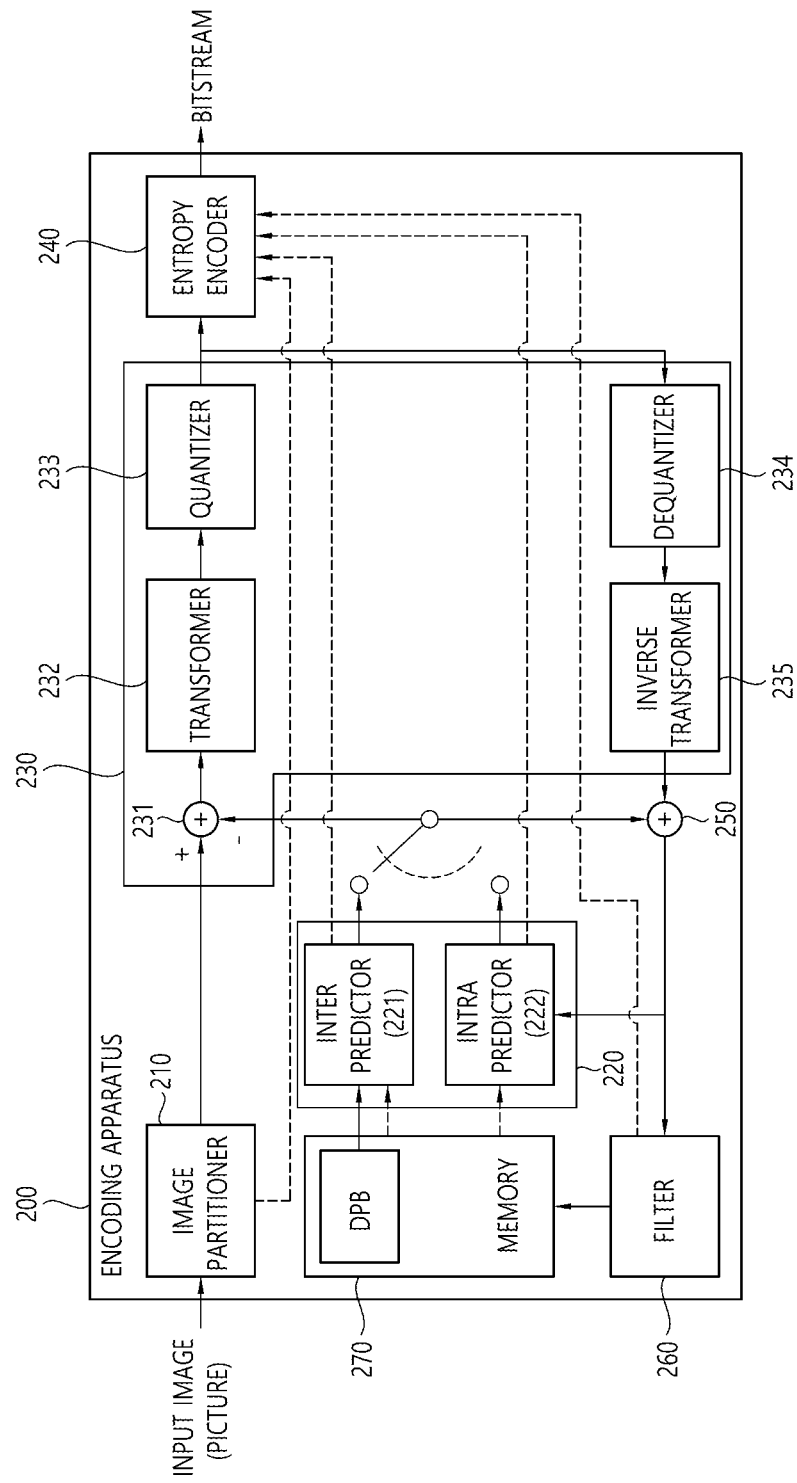
FIG. 2 is a diagram schematically illustrating a configuration of a video/image encoding apparatus to which the embodiments of the present document are applicable.

FIG. 2 is a diagram schematically illustrating the configuration of a video/image encoding apparatus to which the embodiments of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor 220 may perform prediction on a processing target block (hereinafter, referred to as a current block) and generate a predicted block including prediction samples for the current block. The predictor 220 may determine whether intra prediction or inter prediction is applied in units of a current block or CU. The predictor 220 may generate various kinds of information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor 220 may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in the present document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal.

The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form.

The entropy encoder 240 may perform various encoding methods such as, for example, exponential Golomb, context-adaptive variable length coding (CAVLC), and context-adaptive binary arithmetic coding (CABAC). The entropy encoder 240 may encode information necessary for video/image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In the present document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Meanwhile, image/video coding according to the present disclosure may include multilayer-based image/video coding. The multilayer-based image/video coding may include scalable coding. The multilayer-based coding or scalable coding may process input signals for each layer. Input signals (input image/picture) may differ in at least one of resolution, frame rate, bit-depth, color format, aspect ratio, and view depending on the layers. In this case, it is possible to reduce repeated transmission/processing of information and increase compression efficiency by performing prediction between layers using a difference between layers, namely, based on scalability.

Figure 3:
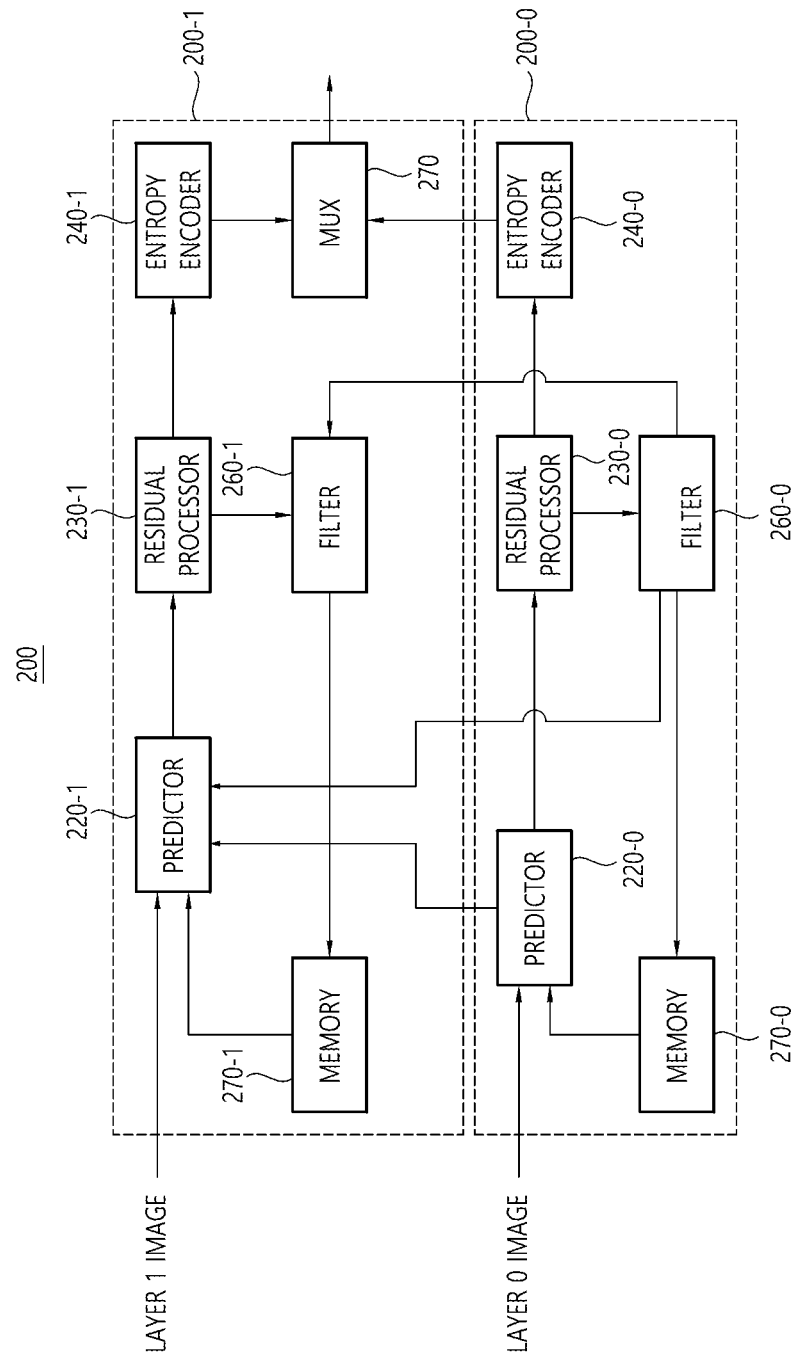
FIG. 3 is a diagram for schematically describing the configuration of a multilayer-based video/image encoding apparatus to which embodiments of the present disclosure are applicable.

FIG. 3 is a block diagram of an encoding apparatus performing multilayer-based encoding of a video/image signal according to an embodiment(s) of the present disclosure.

The encoding apparatus of FIG. 3 may include the encoding apparatus of FIG. 2. In FIG. 3, the image partitioner and the adder are omitted. However, the encoding apparatus may include the image partitioner and the adder. In this case, the image partitioner and the adder may be included in layer units. The present figure mainly describes multilayer-based prediction. Descriptions other than that may consult the descriptions given with reference to FIG. 2.

The example of FIG. 3 assumes a multilayer structure consisting of two layers for the convenience of description.

However, embodiments of the present disclosure are not limited to the specific example, and it should be noted that the multilayer structure to which the embodiments of the present disclosure are applied may include two or more layers.

Referring to FIG. 3, the encoding apparatus 300 includes an encoder 300-1 for layer 1 and an encoder 300-0 for layer 0.

Layer 0 may be a base layer, a reference layer, or a lower layer; layer 1 may be an enhancement layer, a current layer, or a higher layer.

The encoder 300-1 of layer 1 includes a predictor 320-1, a residual processor 330-1, a filter 360-1, a memory 370-1, an entropy encoder 340-1, and a multiplexer (MUX) 370. The MUX may be included as an external component.

The encoder 200-0 of layer 0 includes a predictor 320-0, a residual processor 330-0, a filter 360-0, a memory 370-0, and an entropy encoder 340-0.

The predictor 320-0, 320-1 may perform prediction on the input image based on various prediction techniques as described above. For example, the predictor 320-0, 320-1 may perform inter prediction and intra prediction. The predictor 320-0, 320-1 may perform prediction in predetermined processing units. A prediction unit may be a coding unit (CU) or a transform unit (TU). A predicted block (including prediction samples) may be generated according to a prediction result, and the residual processor may derive a residual block (including residual samples) based on the predicted block.

Through inter prediction, a prediction block may be generated by performing prediction based on the information on at least one of a preceding picture and/or a succeeding picture of the current picture. Through intra prediction, a prediction block may be generated by performing prediction based on neighboring samples within the current picture.

Various prediction mode methods described above may be used for an inter prediction mode or method. Inter prediction may select a reference picture with respect to a current block to be predicted and a reference block related to the current block within the reference picture. The predictor 320-0, 320-1 may generate a predicted block based on the reference block.

Also, the predictor 320-1 may perform prediction on layer 1 using the information of layer 0. In the present disclosure, a method of predicting information of a current layer using the information of another layer is referred to as inter-layer prediction for the convenience of description.

Information of the current layer predicted based on the information of another layer (i.e., predicted by inter-layer prediction) includes at least one of texture, motion information, unit information, and predetermined parameters (e.g., filtering parameters).

Also, information of another layer used for prediction of the current layer (i.e., used for inter-layer prediction) may include at least one of texture, motion information, unit information, and predetermined parameters (e.g., filtering parameters).

In inter-layer prediction, a current block may be a block within the current picture of a current layer (e.g., layer 1) and may be a target block to be coded. A reference block may be a block within a picture (reference picture) belonging to the same access unit (AU) as the picture (current picture) to which the current block belongs in a layer (reference layer, for example, layer 0) referenced for prediction of the current block and may be a block corresponding to the current block. Here, the access unit may be a set of picture units (PUs) including encoded pictures related to the same time output from different layers and the DPB. A picture unit may be a set of NAL units related to each other according to a specific classification rule, consecutive in decoding order, and containing only one encoded picture. A coded video sequence (CVS) may be a set of AUs.

One example of inter-layer prediction is inter-layer motion prediction that predicts motion information of a current layer using motion information of a reference layer. According to inter-layer motion prediction, motion information of a current block may be predicted based on the motion information of a reference block. In other words, in deriving motion information based on the inter prediction mode to be described later, a motion information candidate may be derived using the motion information of an inter-layer reference block instead of a temporal neighboring block.

When inter-layer motion prediction is applied, the predictor 320-1 may scale and use the reference block (i.e., inter-layer reference block) motion information of the reference layer.

In another example of inter-layer prediction, inter-layer texture prediction may use the texture of a reconstructed reference block as a prediction value for the current block. In this case, the predictor 220-1 may scale the texture of the reference block through upsampling. Inter-layer texture prediction may be called inter-layer (reconstructed) sample prediction or simply inter-layer prediction.

In inter-layer parameter prediction, which is yet another example of inter-layer prediction, a parameter derived from the reference layer may be reused in the current layer, or a parameter for the current layer may be derived based on the parameter used in the reference layer.

In inter-layer residual prediction, which is still another example of inter-layer prediction, residuals of the current layer may be predicted using residual information of another layer, and prediction for the current block may be performed based on the predicted residuals.

In inter-layer differential prediction, which is yet still another example of inter-layer prediction, prediction for the current block may be performed using a difference between images obtained by upsampling or downsampling of a reconstructed picture of the current layer and a reconstructed picture of the reference layer.

In inter-layer syntax prediction, which is still yet another example of inter-layer prediction, the texture of a current block may be predicted or generated using syntax information of the reference layer. In this case, the syntax information of the referenced reference layer may include information on the intra prediction mode and motion information.

When predicting a specific block, a plurality of prediction methods using the inter-layer prediction may use multiple layers.

Here, as examples of inter-layer prediction, inter-layer texture prediction, inter-layer motion prediction, inter-layer unit information prediction, inter-layer parameter prediction, inter-layer residual prediction, inter-layer differential prediction, and inter-layer syntax prediction have been described; however, inter-layer prediction applicable to the present disclosure is not limited to the examples above.

For example, inter-layer prediction may be applied as an extension of inter prediction for the current layer. In other words, inter prediction for the current block may be performed by including a reference picture derived from the reference layer in the reference pictures that may be referenced for inter prediction of the current block.

In this case, the inter-layer reference picture may be included in a reference picture list for the current block.

Using the inter-layer reference picture, the predictor 320-1 may perform inter prediction on the current block.

Here, the inter-layer reference picture may be a reference picture constructed by sampling a reconstructed picture of the reference layer to correspond to the current layer. Therefore, when the reconstructed picture of the reference layer corresponds to a picture of the current layer, the reconstructed picture of the reference layer may be used as the inter-layer reference picture without sampling. For example, when the width and height of samples in a reconstructed picture of the reference layer are the same as those of samples in a reconstructed picture of the current layer; and the offsets between the upper left, upper right, lower left, and lower right of a picture of the reference layer and the upper left, upper right, lower left, and lower right of a picture of the current layer are 0, the reconstructed picture of the reference layer may be used as the inter-layer reference picture of the current layer without re-sampling.

Also, the reconstructed picture of the reference layer from which the inter-layer reference picture is derived may be a picture belonging to the same AU as the current picture to be encoded.

When inter prediction for the current block is performed by including an inter-layer reference picture in the reference picture list, the positions of the inter-layer reference picture within the reference picture list L0 and L1 may be different from each other. For example, in the case of the reference picture list L0, the inter-layer reference picture may be located after short-term reference pictures before the current picture, and in the case of the reference picture list L1, the inter-layer reference picture may be located at the end of the reference picture list.

Here, the reference picture list L0 is a reference picture list used for inter prediction of a P slice or a reference picture list used as a first reference picture list in inter prediction of a B slice. The reference picture list L1 is a second reference picture list used for inter prediction of a B slice.

Therefore, the reference picture list L0 may be composed in the order of a short-term reference picture(s) before the current picture, an inter-layer reference picture, a short-term reference picture(s) after the current picture, and a long-term reference picture. The reference picture list L1 may be composed in the order of a short-term reference picture(s) after the current picture, a short-term reference picture(s) before the current picture, a long-term reference picture, and an inter-layer reference picture.

At this time, a predictive slice (P slice) is a slice on which intra prediction is performed or inter prediction is performed using up to one motion vector and reference picture index per prediction block. A bi-predictive slice (B slice) is a slice on which intra prediction is performed, or prediction is performed using up to two motion vectors and reference picture indexes per prediction block. In this regard, an intra slice (I slice) is a slice to which only intra prediction is applied.

Also, when inter prediction for the current block is performed based on the reference picture list including an inter-layer reference picture, the reference picture list may include a plurality of inter-layer reference pictures derived from a plurality of layers.

When the reference picture list includes a plurality of inter-layer reference pictures, inter-layer reference pictures may be cross-arranged within the reference picture list L0 and L1. For example, suppose that two inter-layer reference pictures, an inter-layer reference picture $ILRP_i$, and an inter-layer reference picture $ILRP_j$ are included in the reference picture list used for inter prediction of the current block. In this case, in the reference picture list L0, $ILRP_i$ may be located after short-term reference pictures before the current picture, and $ILRP_j$ may be located at the end of the list. Also, in the reference picture list L1, $ILRP_i$ may be located at the end of the list, and $ILRP_j$ may be located after short-term reference pictures after the current picture.

In this case, the reference picture list L0 may be composed in the order of the short-term reference picture(s) before the current picture, the inter-layer reference picture $ILRP_i$, the short-term reference picture(s) after the current picture, the long-term reference picture, and the inter-layer reference picture $ILRP_j$. The reference picture list L1 may be composed in the order of the short-term reference picture(s) after the current picture, the inter-layer reference picture $ILRP_j$, the short-term reference picture(s) before the current picture, the long-term reference picture, and the inter-layer reference picture $ILRP_i$.

Also, one of the two inter-layer reference pictures may be an inter-layer reference picture derived from a scalable layer related to resolution, and the other may be an inter-layer reference picture derived from a layer providing a different view. In this case, for example, suppose $ILRP_i$ is an inter-layer reference picture derived from a layer that provides a different resolution, and $ILRP_j$ is an inter-layer reference picture derived from a layer that provides a different view. Then, in the case of scalable video coding that supports only scalability except for a view, the reference picture list L0 may be composed in the order of the short-term reference picture(s) before the current picture, the inter-layer reference picture $ILRP_i$, the short-term reference picture(s) after the current picture, and the long-term reference picture. On the other hand, the reference picture list L1 may be composed in the order of the short-term reference picture(s) after the current picture, the short-term reference picture(s) before the current picture, the long-term reference picture, and the inter-layer reference picture $ILRP_i$.

Meanwhile, for inter-layer prediction, the information of an inter-layer reference picture may be composed of only a sample value, only motion information (motion vector), or both the sample value and the motion information. When the reference picture index indicates the inter-layer reference picture, the predictor 220-1 uses only the sample value of the inter-layer reference picture, motion information (motion vector) of the inter-layer reference picture, or both of the sample value and the motion information of the inter-layer reference picture according to the information received from the encoding apparatus.

When only the sample values of the inter-layer reference picture are used, the predictor 320-1 may derive samples of a block specified by a motion vector in the inter-layer reference picture as prediction samples of the current block. In the case of scalable video coding that does not consider a view, the motion vector in inter prediction (inter-layer prediction) using the inter-layer reference picture may be set to a fixed value (for example, 0).

When only the motion information of an inter-layer reference picture is used, the predictor 320-1 may use a motion vector specified in the inter-layer reference picture as a motion vector predictor for deriving the motion vector of the current block. Also, the predictor 320-1 may use a motion vector specified in the inter-layer reference picture as the motion vector of the current block.

When both the samples and the motion information of the inter-layer reference picture are used, the predictor 220-1 may use the samples related to the current block in the inter-layer reference picture and the motion information (motion vector) specified in the inter-layer reference picture for prediction of the current block.

When inter-layer prediction is applied, the encoding apparatus may transmit a reference index indicating an inter-layer reference picture within the reference picture list to the decoding apparatus and also transmit, to the decoding apparatus, information that specifies which information (sample information, motion information, or sample information and motion information) to use from the inter-layer reference picture, namely, information that specifies dependency type of the dependency related to the inter-layer prediction between two layers.

Figure 4:
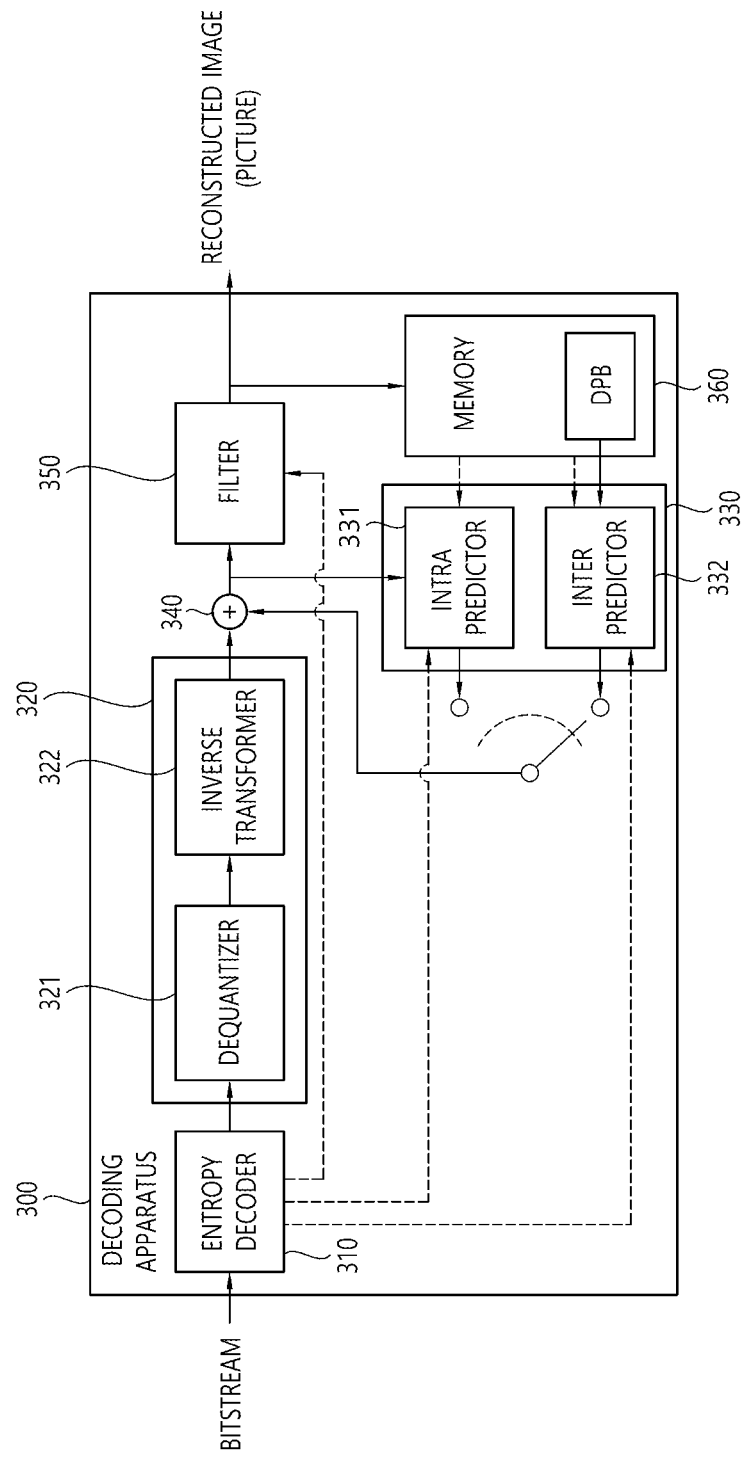
FIG. 4 is a diagram for schematically explaining the configuration of a video/image decoding apparatus to which the embodiments of the present disclosure are applicable.

FIG. 4 is a diagram for schematically explaining the configuration of a video/image decoding apparatus to which the embodiments of the present document may be applied.

Referring to FIG. 4, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (inter predictor 332 and intra predictor 331), and residual values on which the entropy decoding has been performed in the entropy decoder 310, that is, the quantized transform coefficients and related parameter information, may be input to the residual processor 320.

The residual processor 320 may derive a residual signal (residual block, residual samples, or residual sample array). Also, information on filtering among the information decoded by the entropy decoder 310 may be provided to the filter 350. Meanwhile, a receiving unit (not shown) for receiving a signal output from the encoding apparatus may be further configured as an internal/external element of the decoding apparatus 300, or the receiving unit may be a component of the entropy decoder 310. Meanwhile, the decoding apparatus according to the present document may be called a video/image/picture decoding apparatus, and the decoding apparatus may be divided into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, an inter predictor 332, and an intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In the present document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of the present document as well.

The predictor 330 may perform the prediction of the current block, and generate a predicted block including the prediction samples of the current block. The predictor may determine whether the intra prediction is applied or the inter prediction is applied to the current block based on the information on prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in the present document. The palette mode may be considered as an example of intra coding or intra prediction. When the palette mode is applied, information on the palette table and the palette index may be included in the video/image information and signaled.

The intra predictor 331 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In the present document, the embodiments described in the filter 260, the inter predictor 221, and the intra predictor 222 of the encoding apparatus 200 may be applied equally or to correspond to the filter 350, the inter predictor 332, and the intra predictor 331.

Figure 5:
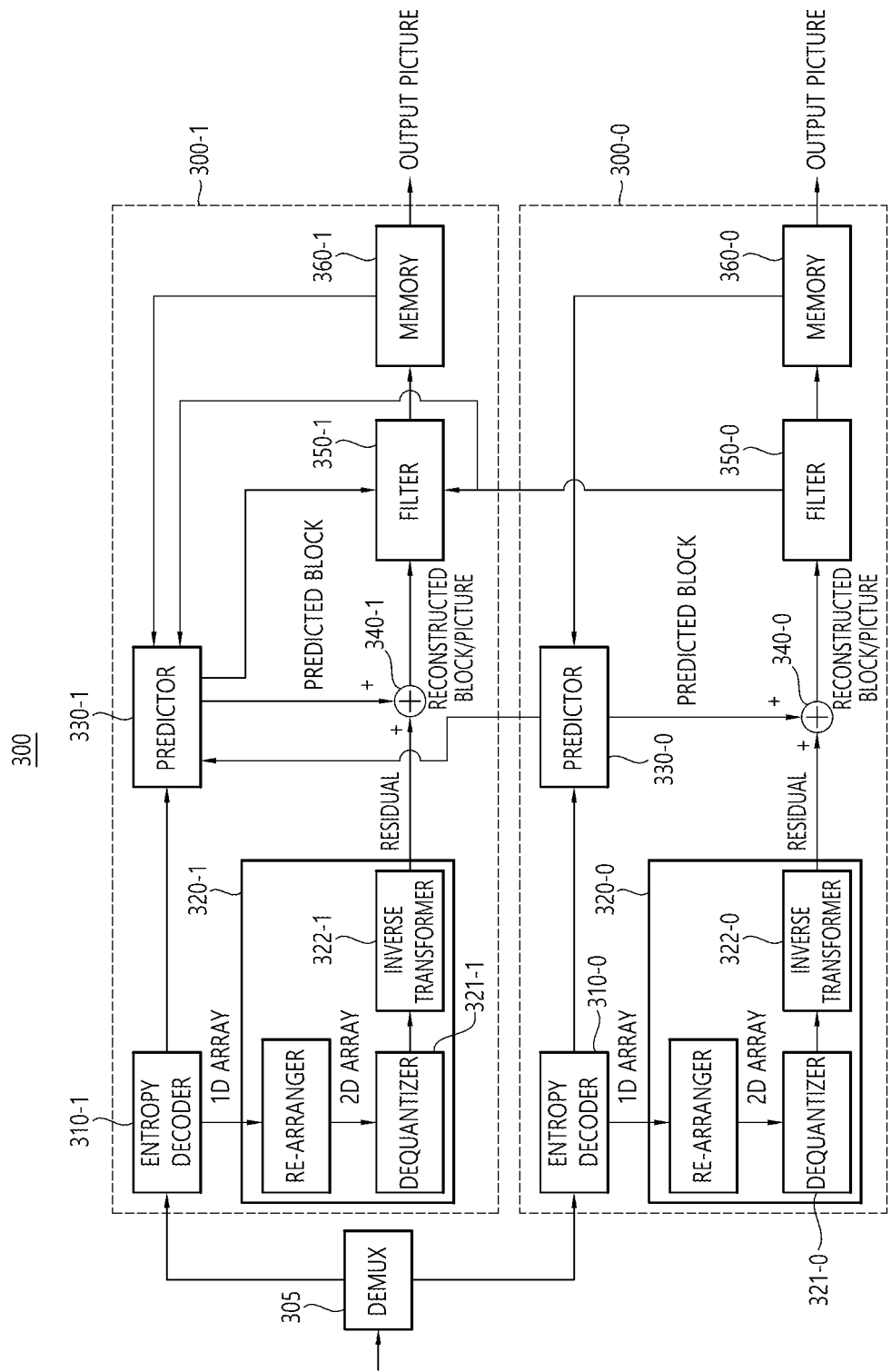
FIG. 5 is a diagram for schematically describing the configuration of a multilayer-based video/image decoding apparatus to which embodiments of the present disclosure are applicable.

FIG. 5 is a diagram for schematically describing the configuration of a multilayer-based video/image decoding apparatus to which embodiments of the present disclosure are applicable.

A decoding apparatus of FIG. 5 may include the decoding apparatus of FIG. 4. In FIG. 5, a re-arranger may be omitted or included in a de-quantizer. This diagram will be described mostly based on multilayer-based prediction. The remaining part may include the contents of the description on FIG. 4.

The example of FIG. 5 assumes a multilayer structure consisting of two layers for the convenience of description. However, embodiments of the present disclosure are not limited to the specific example, and it should be noted that the multilayer structure to which the embodiments of the present disclosure are applied may include two or more layers.

Referring to FIG. 5, the decoding apparatus 500 includes a decoder 500-1 for layer 1 and a decoder 500-0 for layer 0.

The decoder 500-1 of layer 1 may include an entropy decoder 510-1, a residual processor 520-1, a predictor 530-1, an adder 540-1, a filter 550-1 and a memory 560-1.

The decoder 500-0 of layer 0 may include an entropy decoder 510-0, a residual processor 520-0, a predictor 530-0, an adder 540-0, a filter 550-0 and a memory 560-0.

When a bitstream including image information is transmitted from the encoding apparatus, DEMUX 505 may demultiplex the information for each layer and deliver the information to the decoding apparatus for each layer.

The entropy decoder 510-1, 510-0 may perform decoding according to the coding method used in the encoding apparatus. For example, when CABAC is used in the encoding apparatus, the entropy decoder 510-1, 510-0 may also perform entropy decoding based on CABAC.

When the prediction mode for a current block is the intra prediction mode, the predictor 530-1, 530-0 may perform intra prediction on the current block based on neighboring reconstructed samples within the current picture.

When the prediction mode for the current block is an inter prediction mode, the predictor 530-1, 530-0 may perform inter prediction on the current block based on the information included in at least one of a picture before the current picture or a picture after the current picture. The information received from the encoding device may be checked, and part or all of the motion information required for inter prediction may be derived based on the checked information.

When the skip mode is applied as the inter prediction mode, residuals may not be transmitted from the encoding apparatus, and the prediction block may be used as a reconstructed block.

Meanwhile, the predictor 530-1 of layer 1 may perform inter prediction or intra prediction using only the information within layer 1 or may perform inter-layer prediction using the information of another layer (layer 0).

Information of the current layer predicted using the information of a different layer (i.e., predicted by inter-layer prediction) includes at least one of texture, motion information, unit information, and predetermined parameters (e.g., filtering parameters).

Also, information of the different layer used for prediction of the current layer (i.e., used for inter-layer prediction) may include at least one of texture, motion information, unit information, and predetermined parameters (e.g., filtering parameters).

In inter-layer prediction, a current block may be a block within the current picture of a current layer (e.g., layer 1) and may be a target block to be decoded. A reference block may be a block within a picture (reference picture) belonging to the same access unit (AU) as the picture (current picture) to which the current block belongs in a layer (reference layer, for example, layer 0) referenced for prediction of the current block and may be a block corresponding to the current block.

One example of inter-layer prediction is inter-layer motion prediction that predicts motion information of a current layer using motion information of a reference layer. According to inter-layer motion prediction, motion information of a current block may be predicted based on the motion information of a reference block. In other words, in deriving motion information based on the inter prediction mode to be described later, a motion information candidate may be derived using the motion information of an inter-layer reference block instead of a temporal neighboring block.

When inter-layer motion prediction is applied, the predictor 530-1 may scale and use the reference block (i.e., inter-layer reference block) motion information of the reference layer.

In another example of inter-layer prediction, inter-layer texture prediction may use the texture of a reconstructed reference block as a prediction value for the current block. In this case, the predictor 530-1 may scale the texture of the reference block through upsampling. Inter-layer texture prediction may be called inter-layer (reconstructed) sample prediction or simply inter-layer prediction.

In inter-layer parameter prediction, which is yet another example of inter-layer prediction, a parameter derived from the reference layer may be reused in the current layer, or a parameter for the current layer may be derived based on the parameter used in the reference layer.

In inter-layer residual prediction, which is still another example of inter-layer prediction, residuals of the current layer may be predicted using residual information of another layer, and prediction for the current block may be performed based on the predicted residuals.

In inter-layer differential prediction, which is yet still another example of inter-layer prediction, prediction for the current block may be performed using a difference between images obtained by upsampling or downsampling of a reconstructed picture of the current layer and a reconstructed picture of the reference layer.

In inter-layer syntax prediction, which is still yet another example of inter-layer prediction, the texture of a current block may be predicted or generated using syntax information of the reference layer. In this case, the syntax information of the referenced reference layer may include information on the intra prediction mode and motion information.

When predicting a specific block, a plurality of prediction methods using the inter-layer prediction may use multiple layers.

Here, as examples of inter-layer prediction, inter-layer texture prediction, inter-layer motion prediction, inter-layer unit information prediction, inter-layer parameter prediction, inter-layer residual prediction, inter-layer differential prediction, and inter-layer syntax prediction have been described; however, inter-layer prediction applicable to the present disclosure is not limited to the examples above.

For example, inter-layer prediction may be applied as an extension of inter prediction for the current layer. In other words, inter prediction for the current block may be performed by including a reference picture derived from the reference layer in the reference pictures that may be referenced for inter prediction of the current block.

When the reference picture index received from the encoding apparatus or the reference picture index derived from neighboring blocks indicates an inter-layer reference picture within the reference picture list, the predictor 530-1 may perform inter-layer prediction using the inter-layer reference picture. For example, when the reference picture index indicates the inter-layer reference picture, the predictor 530-1 may derive sample values of a region specified by a motion vector in the inter-layer reference picture as a prediction block for the current block.

In this case, the inter-layer reference picture may be included in a reference picture list for the current block. Using the inter-layer reference picture, the predictor 530-1 may perform inter prediction on the current block.

Here, the inter-layer reference picture may be a reference picture constructed by sampling a reconstructed picture of the reference layer to correspond to the current layer. Therefore, when the reconstructed picture of the reference layer corresponds to a picture of the current layer, the reconstructed picture of the reference layer may be used as the inter-layer reference picture without sampling. For example, when the width and height of samples in a reconstructed picture of the reference layer are the same as those of samples in a reconstructed picture of the current layer; and the offsets between the upper left, upper right, lower left, and lower right of a picture of the reference layer and the upper left, upper right, lower left, and lower right of a picture of the current layer are 0, the reconstructed picture of the reference layer may be used as the inter-layer reference picture of the current layer without re-sampling.

Also, the reconstructed picture of the reference layer from which the inter-layer reference picture is derived may be a picture belonging to the same AU as the current picture to be encoded. When inter prediction for the current block is performed by including an inter-layer reference picture in the reference picture list, the positions of the inter-layer reference picture within the reference picture list L0 and L1 may be different from each other. For example, in the case of the reference picture list L0, the inter-layer reference picture may be located after short-term reference pictures before the current picture, and in the case of the reference picture list L1, the inter-layer reference picture may be located at the end of the reference picture list.

Here, the reference picture list L0 is a reference picture list used for inter prediction of a P slice or a reference picture list used as a first reference picture list in inter prediction of a B slice. The reference picture list L1 is a second reference picture list used for inter prediction of a B slice.

Therefore, the reference picture list L0 may be composed in the order of a short-term reference picture(s) before the current picture, an inter-layer reference picture, a short-term reference picture(s) after the current picture, and a long-term reference picture. The reference picture list L1 may be composed in the order of a short-term reference picture(s) after the current picture, a short-term reference picture(s) before the current picture, a long-term reference picture, and an inter-layer reference picture.

At this time, a predictive slice (P slice) is a slice on which intra prediction is performed or inter prediction is performed using up to one motion vector and reference picture index per prediction block. A bi-predictive slice (B slice) is a slice on which intra prediction is performed, or prediction is performed using up to two motion vectors and reference picture indexes per prediction block. In this regard, an intra slice (I slice) is a slice to which only intra prediction is applied.

Also, when inter prediction for the current block is performed based on the reference picture list including an inter-layer reference picture, the reference picture list may include a plurality of inter-layer reference pictures derived from a plurality of layers.

When the reference picture list includes a plurality of inter-layer reference pictures, inter-layer reference pictures may be cross-arranged within the reference picture list L0 and L1. For example, suppose that two inter-layer reference pictures, an inter-layer reference picture $ILRP_i$, and an inter-layer reference picture $ILRP_j$ are included in the reference picture list used for inter prediction of the current block. In this case, in the reference picture list L0, $ILRP_i$ may be located after short-term reference pictures before the current picture, and $ILRP_j$ may be located at the end of the list. Also, in the reference picture list L1, $ILRP_i$ may be located at the end of the list, and $ILRP_j$ may be located after short-term reference pictures after the current picture.

In this case, the reference picture list L0 may be composed in the order of the short-term reference picture(s) before the current picture, the inter-layer reference picture $ILRP_i$, the short-term reference picture(s) after the current picture, the long-term reference picture, and the inter-layer reference picture $ILRP_j$. The reference picture list L1 may be composed in the order of the short-term reference picture(s) after the current picture, the inter-layer reference picture $ILRP_j$, the short-term reference picture(s) before the current picture, the long-term reference picture, and the inter-layer reference picture $ILRP_i$.

Also, one of the two inter-layer reference pictures may be an inter-layer reference picture derived from a scalable layer related to resolution, and the other may be an inter-layer reference picture derived from a layer providing a different view. In this case, for example, suppose $ILRP_i$ is an inter-layer reference picture derived from a layer that provides a different resolution, and $ILRP_j$ is an inter-layer reference picture derived from a layer that provides a different view. Then, in the case of scalable video coding that supports only scalability except for a view, the reference picture list L0 may be composed in the order of the short-term reference picture(s) before the current picture, the inter-layer reference picture $ILRP_i$, the short-term reference picture(s) after the current picture, and the long-term reference picture. On the other hand, the reference picture list L1 may be composed in the order of the short-term reference picture(s) after the current picture, the short-term reference picture(s) before the current picture, the long-term reference picture, and the inter-layer reference picture $ILRP_i$.

Meanwhile, for inter-layer prediction, the information of an inter-layer reference picture may be composed of only a sample value, only motion information (motion vector), or both the sample value and the motion information. When the reference picture index indicates the inter-layer reference picture, the predictor 530-1 uses only the sample value of the inter-layer reference picture, motion information (motion vector) of the inter-layer reference picture, or both of the sample value and the motion information of the inter-layer reference picture according to the information received from the encoding apparatus.

When only the sample values of the inter-layer reference picture are used, the predictor 530-1 may derive samples of a block specified by a motion vector in the inter-layer reference picture as prediction samples of the current block. In the case of scalable video coding that does not consider a view, the motion vector in inter prediction (inter-layer prediction) using the inter-layer reference picture may be set to a fixed value (for example, 0).

When only the motion information of an inter-layer reference picture is used, the predictor 530-1 may use a motion vector specified in the inter-layer reference picture as a motion vector predictor for deriving the motion vector of the current block. Also, the predictor 530-1 may use a motion vector specified in the inter-layer reference picture as the motion vector of the current block.

When both the samples and the motion information of the inter-layer reference picture are used, the predictor 530-1 may use the samples related to the current block in the inter-layer reference picture and the motion information (motion vector) specified in the inter-layer reference picture for prediction of the current block.

The decoding apparatus may receive a reference index indicating an inter-layer reference picture within the reference picture list from the encoding apparatus and perform inter-layer prediction based on the received reference index. Also, the decoding apparatus may receive, from the encoding apparatus, information that specifies which information (sample information, motion information, or sample information and motion information) to use from the inter-layer reference picture, namely, information that specifies dependency type of the dependency related to the inter-layer prediction between two layers.

Meanwhile, in the video/image coding according to the present document, an image processing unit may have a hierarchical structure. One picture may be partitioned into one or more tiles, bricks, slices, and/or tile groups. One slice may include one or more bricks. On brick may include one or more CTU rows within a tile. The slice may include an integer number of bricks of a picture. One tile group may include one or more tiles. One tile may include one or more CTUs. The CTU may be partitioned into one or more CUs. A tile represents a rectangular region of CTUs within a particular tile column and a particular tile row in a picture. A tile group may include an integer number of tiles according to a tile raster scan in the picture. A slice header may carry information/parameters that can be applied to the corresponding slice (blocks in the slice). In case that the encoding/decoding apparatus has a multi-core processor, encoding/decoding processes for the tiles, slices, bricks, and/or tile groups may be processed in parallel. In the present document, the slice or the tile group may be used exchangeably. That is, a tile group header may be called a slice header. Here, the slice may have one of slice types including intra (I) slice, predictive (P) slice, and bi-predictive (B) slice. In predicting blocks in I slice, inter prediction may not be used, and only intra prediction may be used. Of course, even in this case, signaling may be performed by coding the original sample value without prediction. With respect to blocks in P slice, intra prediction or inter prediction may be used, and in case of using the inter prediction, only uni-prediction can be used. Meanwhile, with respect to blocks in B slice, the intra prediction or inter prediction may be used, and in case of using the inter prediction, up to bi-prediction can be maximally used.

The encoding apparatus may determine the tile/tile group, brick, slice, and maximum and minimum coding unit sizes in consideration of the coding efficiency or parallel processing, or according to the characteristics (e.g., resolution) of a video image, and information for them or information capable of inducing them may be included in the bitstream.

The decoding apparatus may obtain information representing the tile/tile group, brick, and slice of the current picture, and whether the CTU in the tile has been partitioned into a plurality of coding units. By making such information be obtained (transmitted) only under a specific condition, the efficiency can be enhanced.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. The slice header (slice header syntax) may include information/parameters that may be commonly applied to the slice. An APS (APS syntax) or PPS (PPS syntax) may include information/parameters that may be commonly applied to one or more slices or pictures. An SPS (SPS syntax) may include information/parameters that may be commonly applied to one or more sequences. A VPS (VPS syntax) may include information/parameters that may be commonly applied to multiple layers. DCI may include information/parameters related to decoding capability.

The high level syntax (HLS) in the present specification may include at least one of the APS syntax, the PPS syntax, the SPS syntax, the VPS syntax, the DCI syntax, the picture header syntax, and the slice header syntax.

Additionally, for example, information on the partitioning and configuration, and so on, of a tile/tile group/brick/slice may be configured in an encoding apparatus based on the high level syntax and may then be delivered (or transferred) to a decoding apparatus in a bitstream format.

Figure 6:
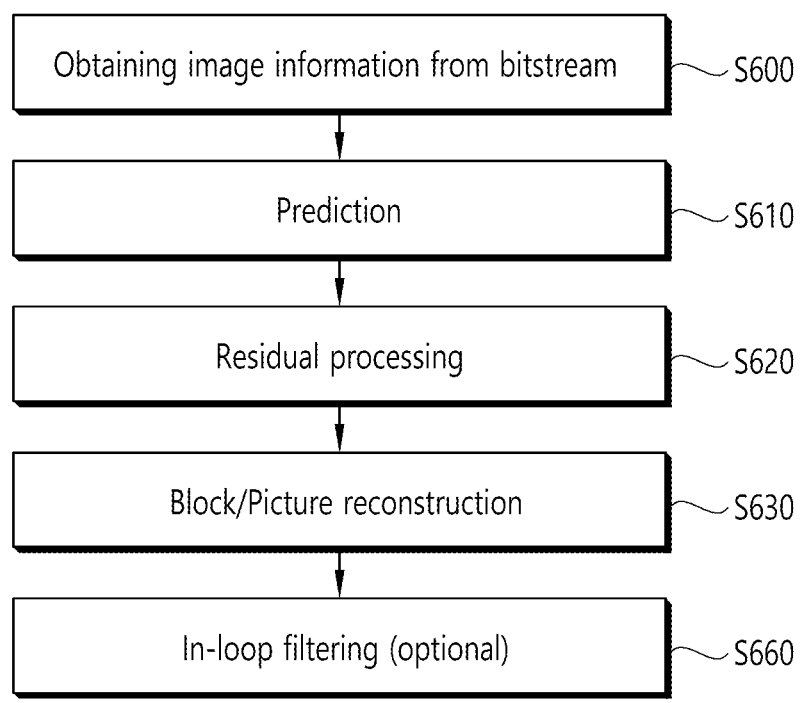
FIG. 6 shows a schematic example of a picture decoding procedure to which embodiments of the present disclosure are applicable.

FIG. 6 shows a schematic example of a picture decoding procedure to which embodiments of the present disclosure are applicable.

In image/video coding, a picture that configures an image/video may be encoded/decoded according to a decoding order. A picture order that corresponds to an output order of a decoded picture may be configured differently from the decoding order. And, when performing inter prediction based on the configured picture order, forward prediction as well as reverse prediction may be performed.

In FIG. 6, S600 may be performed by the entropy decoder 310 of the decoding apparatus that is described above in FIG. 4, S610 may be performed by the predictor 330, uuS620 may be performed by the residual processor 320, S630 may be performed by the adder 340, and S640 may be performed by the filter 350. S600 may include an information decoding procedure that is described in the present specification, S610 may include an inter/intra prediction procedure that is described in the present specification, S620 may include a residual processing procedure that is described in the present specification, S630 may include a block/picture reconstruction procedure that is described in the present specification, and S640 may include an in-loop filtering procedure that is described in the present specification.

Referring to FIG. 6, as described above in FIG. 4, the picture decoding procedure may generally include a procedure of obtaining an image/video information (S600) from a bitstream (through decoding), a picture reconstruction procedure (S610 to S630), and an in-loop filtering procedure (S640) for the reconstructed picture. The picture reconstruction procedure may be performed based on prediction samples and residual samples that are obtained by performing the inter/intra prediction procedure (S610) and the residual handling (or processing) procedure (S620, dequantization and inverse transform procedures on quantized transform coefficients). By performing an in-loop filtering procedure on the reconstructed picture that is generated by performing the picture reconstruction procedure, a modified reconstructed picture may be generated, and the modified reconstructed picture may be outputted as a decoded picture, which is then stored in a decoding picture buffer or memory 360 of the decoding apparatus so as to be used as a reference picture during an inter prediction procedure when performing decoding of a picture in a later process. In some cases, the in-loop filtering procedure may be skipped. And, in this case, the reconstructed picture may be outputted as the decoded picture, which is then stored in a decoding picture buffer or memory 360 of the decoding apparatus so as to be used as a reference picture during an inter prediction procedure when performing decoding of a picture in a later process. As described above, the in-loop filtering procedure (S640) may include a deblocking filtering procedure, a sample adaptive offset (SAO) procedure, an adaptive loop filter (ALF) procedure, and/or a bi-lateral filter procedure, and so on, and part or all of the in-loop filtering procedure may be skipped. Additionally, one or part of the deblocking filtering procedure, the sample adaptive offset (SAO) procedure, the adaptive loop filter (ALF) procedure, and the bi-lateral filter procedure may be sequentially applied, or all of the deblocking filtering procedure, the sample adaptive offset (SAO) procedure, the adaptive loop filter (ALF) procedure, and the bi-lateral filter procedure may be sequentially applied. For example, after the deblocking filtering procedure is applied to a reconstructed picture, the SAO procedure may be performed. Alternatively, for example, after the deblocking filtering procedure is applied to a reconstructed picture, the ALF procedure may be performed. This may also be performed likewise in an encoding apparatus.

Figure 7:
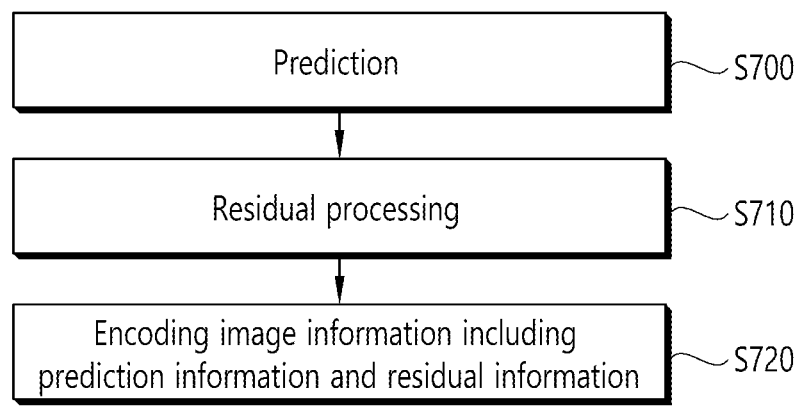
FIG. 7 shows a schematic example of a picture encoding procedure to which embodiments of the present disclosure are applicable.

FIG. 7 shows a schematic example of a picture encoding procedure to which embodiments of the present disclosure are applicable.

In FIG. 7, S700 may be performed by the predictor 220 of the encoding apparatus that is described above in FIG. 2, S710 may be performed by the residual processor 230, and S720 may be performed by the entropy encoder 240. S700 may include an inter/intra prediction procedure that is described in the present specification, S710 may include a residual processing procedure that is described in the present specification, and S720 may include an information encoding procedure that is described in the present specification.

Referring to FIG. 7, as described above in FIG. 2, the picture encoding procedure may generally include a procedure of encoding information for picture reconstruction (e.g., prediction information, residual information, partitioning information, and so on) and outputting the encoded information in a bitstream format, as well as a procedure of generating a reconstructed picture for a current picture and a procedure of applying in-loop filtering to the reconstructed picture (optional). The encoding apparatus may derive residual samples (that are modified) from quantized transform coefficients through the dequantizer 234 and the inverse transformer 235, and, then, the encoding apparatus may generate a reconstructed picture based on prediction samples, which are the output of S700, and the (modified) residual samples. The reconstructed picture that is generated as described above may be the same as the above-described reconstructed picture that is generated in the decoding apparatus. A modified reconstructed picture may be generated by performing an in-loop filtering procedure on the reconstructed picture, which is then stored in a decoding picture buffer or memory 270 of the decoding apparatus. And, just as in the decoding apparatus, the modified reconstructed picture may be used as a reference picture during an inter prediction procedure when encoding a picture. As described above, in some cases, part or all of the in-loop filtering procedure may be skipped. When the in-loop filtering procedure is performed, (in-loop) filtering related information (parameter) may be encoded in the entropy encoder 240 and then transmitted in a bitstream format, and the decoding apparatus may perform the in-loop filtering procedure by using the same method as the encoding apparatus based on the filtering related information.

By performing the above-described in-loop filtering procedure, noise occurring when coding an image/moving picture image, such as a blocking artifact and a ringing artifact, may be reduced, and subjective/objective visual quality may be enhanced. Additionally, by having both the encoding apparatus and the decoding apparatus perform the in-loop filtering procedure, the encoding apparatus and the decoding apparatus may derive the same prediction result, increase reliability in picture coding, and reduce the size (or amount) of data that should be transmitted for picture coding.

As described above, the picture reconstruction procedure may be performed in the decoding apparatus as well as in the encoding apparatus. A reconstructed block may be generated for each block unit based on intra prediction/inter prediction, and a reconstructed picture including reconstructed blocks may be generated. When a current picture/slice/tile group is an I picture/slice/tile group, the blocks included in the current picture/slice/tile group may be reconstructed based only on intra prediction. Meanwhile, when the current picture/slice/tile group is a P or B picture/slice/tile group, the blocks included in the current picture/slice/tile group may be reconstructed based on intra prediction or inter prediction. In this case, inter prediction may be applied to part of the blocks within the current picture/slice/tile group, and intra prediction may be applied to the remaining blocks. Color components of a picture may include a luma component and a chroma component. And, unless it is explicitly limited (or restricted) in the present specification, the methods and embodiments that are proposed in the present specification may be applied to the luma component and the chroma component.

Figure 8:
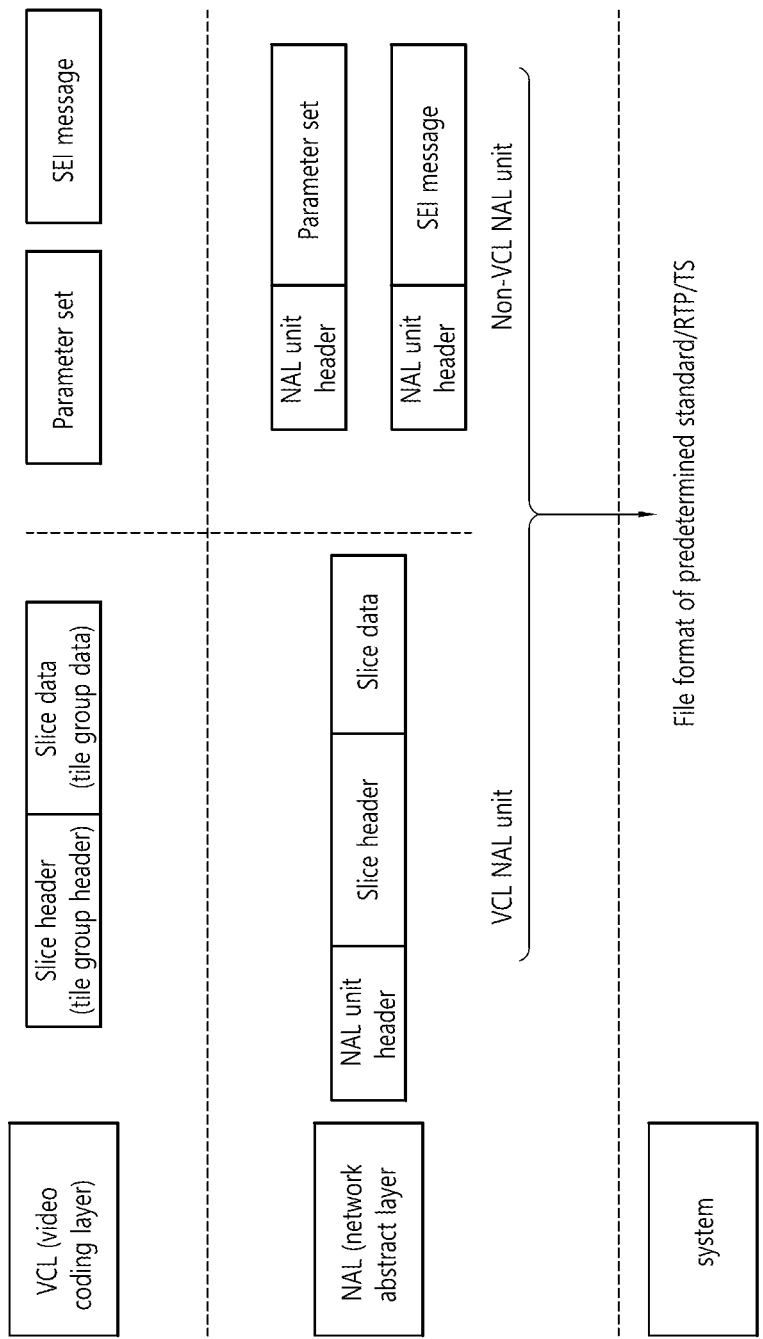
FIG. 8 exemplarily shows a hierarchical structure for a coded image/video.

FIG. 8 exemplarily shows a hierarchical structure for a coded image/video.

Referring to FIG. 8, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

DCI (Decoding Capability Information) NAL unit: Type for NAL unit including DCI

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

APS (Adaptation Parameter Set) NAL unit: Type for NAL unit including APS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DCI (DCI syntax) may include information/parameters related to decoding capability.

In the present specification, a high level syntax (HLS) may include at least one of the APS syntax, PPS syntax, SPS syntax, VPS syntax, DCI syntax, picture header syntax, and slice header syntax. Meanwhile, in the present specification, a low level syntax (LLS) may, for example, include a slice data syntax, a CTU syntax, a transform unit syntax, and so on.

In the present specification, image/video information, which is encoded from the encoding apparatus to the decoding apparatus and then signaled in a bitstream format, may include not only information related to intra-picture partitioning, intra/inter prediction information, residual information, in-loop filtering information, and so on, but may also include information of the slice header, information of the picture header, information of the APS, information of the PPS, information of the SPS, information of the VPS, and/or information of the DCI. Additionally, the image/video information may further include general constraint information and/or information of a NAL unit header.

Meanwhile, as described above, the video/image information of the present specification may include high layer signaling, and a video/image coding method may be performed based on the video/image information.

A coded picture may include one or more slices. Parameters describing the coded picture may be signaled in a picture header, and parameters describing the slice(s) may be signaled in a slice header. The picture header (PH) is carried in its own NAL unit type. The slice header is present in a starting part of a NAL unit including a payload of the slice (slice data).

Additionally, a coded picture may include slices of another NAL unit type. The picture should refer to a picture parameter set including a mixed_nalu_types_in_pic_flag syntax element.

If the mixed_nalu_types_in_pic_flag value is equal to 1, this indicates that each picture referring to the PPS has one or more VCL NAL units, that the VCL NAL unit does not have the same value as the nal_unit_type, and that the picture is not an IRAP picture. And, if the mixed_nalu_types_in_pic_flag value is equal to 0, this indicates that each picture referring to the PPS has one or more VCL NAL units, and that the VCL NAL unit of each picture referring to the PPS has the same value as the nal_unit_type.

In case a value of no_mixed_nalu_types_in_pic_constraint_flag is equal to 1, the mixed_nalu_types_in_pic_flag value is equal to 0.

For each slice having a nal_unit_type value of nalUnitTypeA, within a range from IDR_W_RADL to CRA_NUT, in a picture picA that includes one or more slices having a nal_unit_type of another value (i.e., a mixed_nalu_types_in_pic_flag value for picture picA is equal to 1), the following is applied.

A slice should belong to a subpicture subpicA having a corresponding subpic_treat_as_pic_flag [i] value that is equal to 1.

A slice should not belong to a subpicture of picA, which includes a VCL NAL unit having a nal_unit_type that is not the same a nalUnitTypeA.

For all of the following PUs within a Coded Layer Video Sequence (CLVS), RefPicList[0] or RefPicList[1] of a slice within a subpicA should not include a picture that precedes picA in the decoding order within an active entry.

Additionally, the following will be applied for a VCL NAL unit of a specific picture.

If a value of mixed_nalu_types_in_pic_flag is equal to 0, the nal_unit_type value should be the same as all of the coded slice NAL units within the picture. A picture or PU has the same NAL unit type as a coded slice NAL unit of the picture or PU.

Otherwise (if the mixed_nalu_types_in_pic_flag value is equal to 1), one or more VCL NAL units should all have a specific value of the nal_unit_type that is within a range of IDR_W_RADL to CRA_NUT, and other VCL NAL units should all have a specific value of the nal_unit_type that is within a range of TRAIL_NUT to RSV_VCL_6.

Hereinafter, signaling of multilayer information within a video parameter set will be described in detail.

An available layer set (output layer set (OLS), Profile, Tier and Level (PTL) information on OLSs, DPB information, HRD information, and so on) that may be decoded for a multilayer bitstream is as shown below.

TABLE 1

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ){ | |
|       vps_independent_layer_flag[ i ] | u(1) |
|       if( !vps_independent_layer_flag[ i ] ) { | |
|         vps_max_tid_ref_present_flag[ i ] | u(1) |
|         for(j = 0; j < i; j++) { | |
|           vps_direct_ref_layers_flag[ i ][ j ] | u(1) |
|           if( vps_max_tid_ref_present_flag[ i ] && vps_direct_ref_layer[ i ][ j ] ) | |
|             vps_max_tid_il_ref_pics_plus1[ i ][ j ] | u(3) |
|         } | |
|       } | |
|     } | |
|   } | |
| } | |
| if( vps_max_layers_minus1 > 0 ) { | |
|   if( vps_all_independent_layers_flag ) | |
|     vps_each_layer_is_an_ols_flag | u(1) |
|   if( !vps_each_layer_is_an_ols_flag ) { | |
|     if( !vps_all_independent_layers_flag ) | |
|       vps_ols_mode_idc | u(2) |
|     if( vps_ols_mode_idc = = 2 ) { | |
|       vps_num_output_layer_sets_minus1 | u(8) |
|       for( i = 1; i <= vps_num_output_layer_sets_minus1; i ++) | |
|         for( i = 0; i <= vps_max_layers_minus1; j++ ) | |
|           vps_ols_output_layer_flag[ i ][ j ] | u(1) |
|     } | |
|   } | |
| } | |
| vps_num_ptls_minus1 | u(8) |
| for( i = 0; i <= vps_num_ptls_minus1; i++ ) { | |
|   if( i > 0 ) | |
|     vps_pt_present_flag[ i ] | u(1) |
|   if( !vps_all_layers_same_num_sublayers_flag ) | |
|     vps_ptl_max_temporal_id[ i ] | u(3) |
| } | |
| while( !byte_aligned( ) ) | |
|   vps_ptl_alignment_zero_bit /* equal to 0 */ | f(1) |
| for( i = 0; i <= vps_num_ptls_minus1, i++ ) | |
|   profile_tier_level( vps_pt_present_flag[ i ], vps_ptl_max_temporal_id[ i ] ) | |
| for( i = 0; i < TotalNumOlss; i++ ) | |
|   if( vps_num_ptls_minus1 > 0 && vps_num_ptls_mnus1 + 1 != TotalNumOlss ) | |
|     vps_ols_ptl_idk[ i ] | u(8) |
| if !vps_each_layer_is_an_ols_flag ) { | |
|   vps_num_dpb_params_minus1 | ue(v) |
|   if( vps_max_sublayers_minus1 > 0 ) | |
|     vps_sublayer_dpb_params_present_flag | u(1) |
|   for( i = 0; i < VpsNumDpbParams; i++ ) { | |
|     if( !vps_all_layers_same_num_sublayers_flag ) | |
|       vps_dpb_max_temporal_id[ i ] | u(3) |
|     dpb_parameters( vps_dpb_max_temporal_id[ i ], | |
|       vps_sublayer_dpb_params_present_flag ) | |
|   } | |
|   for( i = 0; i < NumMultiLayersOlss; i++ ) { | |
|     vps_ols_dpb_pic_width[ i ] | ue(v) |
|     vps_ols_dpb_pic_height[ i ] | ue(v) |
|     vps_ols_dpb_chroma_format[ i ] | u(2) |
|     vps_ols_dpb_bitdepth_minus8[ i ] | ue(v) |
|     if( VpsNumDpbParams > 1 && vps_num_dpb_params != NumMultiLayerOlss ) | |
|       vps_ols_dpb_params_idx[ i ] | ue(v) |
|   } | |
|   vps_general_hrd_params_present_flag | u(1) |
| } | |
| if( vps_general_hrd_params_present_flag ) { | |
|   general_hrd_parameters( ) | |
|   if( vps_max_sublayers_minus1 > 0 ) | |
|     vps_sublayer_cpb_params_present_flag | u(1) |
|   vps_num_ols_hrd_params_minus1 | ue(v) |
|   for( i = 0; i <= vps_params_ols_hrd_params_minus1; i++ ) { | |
|     if( !vps_all_layers_same_num_sublayers_flag ) | |

TABLE 1-continued

|  | Descriptor |
|---|---|
|       hrd_max_tld[ i ] | u(3) |
|       firstSubLayer = vps_sublayer_cpb_params_present_flag ? | |
|       0 : vps_hrd_max_tid[ i ] | |
|       ols_hrd_parameters( firstSubLayer, vps_hrd_max_tid[ i ]) | |
|     } | |
|   if( vps_num_ols_hrd_params_minus1 > 0 && | |
|       vps_num_ols_hrd_params_minus1 + 1 !- NumMultiLayerOlss ) | |
|     for( i = 0; i < NumMultiLayerOlss; i++ ) | |
|       vps_ols_hrd_idx[ i ] | ue(v) |
| } | |
| vps_extension_flag | u(1) |
| if( vps_extension_flag ) | |
|   while( more_rbsp_data( ) ) | |
|     vps_extension_data_flag | u(1) |
| rbsp_trailing_bits( ) | |
| } | |

A VPS RBSP of Table 1 should be available for usage in the decoding process before being referred to, and the VPS RBSP should include at least one AU having a temporary identifier (temporalId) that is equal to 0 or should be provided through external means.

The VPS NAL units each having a vps_video_parameter_set_id of a specific value within a Coded Video Sequence (CVS) should all have the same content.

The vps_video_parameter_set_id provides an identifier for a VPS so that reference can be made by another syntax element. The vps_video_parameter_set_id value should be greater than 0.

vps_max_layers_minus1+1 indicates a maximum number of allowed layers within each CVS that refers to a VPS.

vps_max_sublayers_minus1 plus 1 indicates a maximum number of temporal sublayers that may be present in the layer(s) within each CVS that refers to a VPS. The value of vps_max_sublayers_minus1 should be within a range of 0 to 6.

When the vps_all_layers_same_num_sublayers_flag value is equal to 1, this indicates that the number of temporal sublayers is the same for all layers within each CVS that refers to a VPS. And, when the vps_all_layers_same_num_sublayers_flag value is equal to 0, this indicates that layers within each CVS that refers to a VPS may have the same number of temporal sublayers or may not have the same number of temporal sublayers. When a vps_all_layers_same_num_sublayers_flag syntax element is not present in a VPS syntax, the vps_all_layers_same_num_sublayers_flag value is inferred to be equal to 1 (or deduced as 1).

If the value of vps_all_independent_layers_flag is equal to 1, this indicates that all of the layers within a CVS are independently coded without using inter layer prediction. If the vps_all_independent_layers_flag value is equal to 1, this indicates that one or more layers within a CVS may use inter layer prediction. When a vps_all_independent_layers_flag syntax element is not present in a VPS syntax, the vps_all_independent_layers_flag value is inferred to be equal to 1.

vps_layer_id [i] indicates a nuh_layer_id value of an i-th layer. For two non-negative integer values between m and n, when m is smaller than n, a vps_layer_id [m] value should be smaller than a vps_layer_id [n] value.

When a vps_independent_layer_flag [i] value is equal to 1, this indicates that a layer having index i does not use inter layer prediction. And, when the vps_independent_layer_flag [i] value is equal to 0, this indicates that a layer having index i may use inter layer prediction, and that a syntax element vps_direct_ref_layer_flag [i][j] for j of a range from 0 to i−1 inclusive is present within a VPS. When a vps_independent_layer_flag syntax element is not present in a VPS syntax, the vps_independent_layer_flag value is inferred to be equal to 1.

When a vps_max_tid_ref_present_flag [i] value is equal to 1, this indicates that syntax element vps_max_tid_ref_pics_plus1 [i][j] is present. And, when the vps_max_tid_ref_present_flag [i] value is equal to 0, this indicates that the syntax element vps_max_tid_ref_pics_plus1 [i][j] is not present.

If a vps_direct_ref_layer_flag [i][j] value is equal to 0, this indicates that a layer having index j is not a direct reference layer for a layer having index i. And, if the vps_direct_ref_layer_flag [i][j] value is equal to 1, this indicates that a layer having index j is a direct reference layer for a layer having index i. If the vps_direct_ref_layer_flag [i][j] is not present for i and j, which are within a range from 0 to vps_max_layers_minus1, the value of vps_direct_ref_layer_flag [i][j] is inferred to be equal to 0. When the vps_independent_layer_flag [i] value is equal to 0, one or more values of j of a range from 0 to i−1 inclusive should be present in order to allow the vps_direct_ref_layer_flag [i] [j] to be equal to 1.

NumDirectRefLayers [i], DirectRefLayerIdx [i][d], NumRefLayers [i], RefLayerIdx [i][r], and LayerUsedAsRefLayerFlag [j] are derived (or inferred) as described below.

If a vps_max_tid_il_ref_pics_plus1 [i][j] value is equal to 0, this indicates that a picture of a j-th layer, which is not an IRAP picture nor a GDR picture having a ph_recovery_poc_cnt value of 0, is not used as an ILRP for picture decoding of an i-th layer picture. When the value of vps_max_tid_ref_pics_plus1 [i][j] is greater than 0, this indicates that a j-th layer picture having a TemporalId that is greater than vps_max_tid_ref_pics_plus1 [i][j]−1 is not used as an ILRP, when decoding an i-th layer picture. When a vps_max_tid_ref_pics_plus1 syntax element is not present in a VPS, the vps_max_tid_ref_pics_plus1 [i][j] value is inferred to be equal to vps_max_sublayers_minus1+1.

If a vps_each_layer_is_an_ols_flag value is equal to 1, this indicates that each OLS includes only one layer and that a layer included in each layer itself within a CVS referring to a VPS is an OLS, which is the only output layer. If the vps_each_layer_is_an_ols_flag is equal to 0, this indicates that one or more OLSs includes two or more layers. If the vps_max_layers_minus1 value is equal to 0, the value of vps_each_layer_is_an_ols_flag may be inferred to be equal to 1. Otherwise, if the vps_all_independent_layers_flag is equal to 0, the value of vps_each_layer_is_an_ols_flag may be inferred to be equal to 0.

If the value of vps_ols_mode_idc is equal to 0, this indicates that a total number of OLSs indicated by the VPS is equal to vps_max_layers_minus1+1, and this also indicates that an i-th OLS includes layers each having a layer index ranging from 0 to i and that only a highest layer within an OLS for each OLS is an output layer.

If the value of vps_ols_mode_idc is equal to 1, this indicates that a total number of OLSs indicated by the VPS is equal to vps_max_layers_minus1+1, and this also indicates that an i-th OLS includes layers each having a layer index ranging from 0 to i and that all layers of an OLS for each OLS are output layers.

If the value of vps_ols_mode_idc is equal to 2, this indicates that the total number of OLSs indicated by the VPS is explicitly signaled, that an output layer for each OLS is explicitly signaled, and that other layers are direct or indirect reference layers of an output layer of an OLS.

The value of vps_ols_mode_idc should be within a range of 0 to 2.

If the vps_all_independent_layers_flag value is equal to 1, and if the vps_each_layer_is_an_ols_flag value is equal to 0, the value of vps_ols_mode_idc is inferred to be equal to 2.

vps_num_output_layer_sets_minus1+1 indicates that a total number of OLSs that is indicated by the VPS when the vps_ols_mode_idc value is equal to 2.

Variable TotalNumOlss indicating the total number of OLSs that is indicated by the VPS is derived (or inferred) as shown below.

TABLE 2

```
if( vps_max_layers_minus1 = = 0 )
    TotalNumOlss = 1
else if( vps_each_layer_is_an_ols_flag | | vps_ols_mode_idc = =
0 | | vps_ols_mode_idc = = 1 )
    TotalNumOlss = vps_max_layers_minus1 + 1
else if( vps ols mode idc = = 2 )
    TotalNumOlss = vps_num_output_layer_sets_minus1 + 1
```

When the value of vps_ols_output_layer_flag [i][j] is equal to 1, this indicates that a layer having nuh_layer_id equal to vps_layer_id [j] is an output layer of an i-th OLS, when the vps_ols_mode_idc value is equal to 2. When the value of the vps_ols_output_layer_flag [i][j] is equal to 0, this indicates that a layer having nuh_layer_id equal to vps_layer_id [j] is not an output layer of an i-th OLS, when the vps_ols_mode_idc value is equal to 2.

Variable NumOutputLayersInOls [i] indicating a number of output layers within an i-th OLS, variable NumSubLayersInLayerInOLS [i][j] indicating a number of sublayers of a j-th layer within an i-th OLS, variable OutputLayerIdInOls [i][j] indicating a nuh_layer_id value of a j-th output layer within an i-th OLS, and variable LayerUsedAsOutputLayerFlag [k] indicating whether or not a k-th layer is used as an output layer within at least one OLS are derived as shown below.

TABLE 3

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] =
vps_max_sub_layers_minus1 + 1
LayerUsedAsOutputLayerFlag[ 0 ] = 1
for( i = 1, i <= vps_max_layers_minus1; i++ ) {
```

TABLE 3-continued

```
    if( vps_each_layer_is_an_ols_flag | | vps_ols_mode_idc < 2 )
        LayerUsedAsOutputLayerFlag[ i ] = 1
    else /*( !vps_each_layer_is_an_ols_flag &&
    vps_ols_mode_idc = = 2 ) */
        LayerUsedAsOutputLayerFlag[ i ] = 0
}
for( i = 1; i < TotalNumOlss; i++ )
    if( vps_each_layer_is_an_ols_flag | | vps_ols_mode_idc = = 0 ) {
        NumOutputLayersInOls[ i ] = 1
        OutputLayerIdInOls[ i ][ 0 ] = vps_layer_id[ i ]
        if( vps_each_layer_is_an_ols_flag )
            NumSubLayersInLayerInOLS[ i ][ 0 ] =
            vps_max_sub_layers_minus1 + 1
        else {
            NumSubLayersInLayerInOLS[ i ][ i ] =
            vps_max_sub_layers_minus1 + 1
            for( k = i - 1, k >= 0; k- - ) {
                NumSubLayersInLayerInOLS[ i ][ k ] = 0
                for( m = k + 1; m <= i; m-+ ) {
                    maxSublayerNeeded = min( NumSubLayersInLayerInOLS[ i
                    ][ m ],
                        vps_max_tid_il_ref_pics_plus1[ m ][ k ] )
                    if( vps_direct_ref_layer_flag[ m ][ k ] &&
                        NumSubLayersInLayerInOLS[ i ][ k ] <
                        maxSublayerNeeded )
                        NumSubLayersInLayerInOLS[ i ][ k ] =
                        maxSublayerNeeded
                }
            }
        }
    } else if( vps_ols_mode_idc = = 1 ) {
        NumOutputLayersInOls[ i ] = i + 1
        for( j = 0; j < NumOutputLayersInOls[ i ]; j++ ) {
            OutputLayerIdInOls[ i ][ j ] = vps_layer_id[ j ]
            NumSubLayersInLayerInOLS[ i ][ j ] =
            vps_max_sub_layers_minus1 + 1
        }
    } else if( vps_ols_mode_idc - - 2 ) {
        for( j = 0; j <= vps_max_layers_minus1; j++ ) {
            layerIncludedInOlsFlag[ i ][ j ] = 0
            NumSubLayersInLayerInOLS[ i ][ j ] = 0
        }
        highestIncludedLayer = 0
        numLayerInOls = 0
        for( k = 0, j = 0; k <= vps_max_layers_minus1; k+- )
            if( vps_ols_output_layer_flag[ i ][ k ] ) {
                layerIncludedInOlsFlag[ i ][ k ] = 1
                highestIncludedLayer - k
                numLayerInOls++
                LayerUsedAsOutputLayerFlag[ k ] = 1
                OutputLayerIdx[ i ][ j ] = k
                OutputLayerIdInOls[ i ][ j++ ] = vps_layer_id[ k ]
                NumSubLayersInLayerInOLS[ i ][ k ] =
                vps_max_sub_layers_minus1 + 1
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ ) {
                if (!layerIncludedInOlsFlag[ i ][ RefLayerIdx[ idx ][ k ] ] )
                    numLayerInOls++
                layerIncludedInOlsFlag[ i ][ RefLayerIdx[ idx ][ k ] ] = 1
            }
        }
        for( k = highestIncludedLayer - 1; k >= 0; k- - )
            if( layerIncludedInOlsFlag[ i ][ k ] &&
            !vps_ols_output_layer_flag[ i ][ k ] )
                for( m = k + 1; m <= highestIncludedLayer; m++ ) {
                    maxSublayerNeeded = min( NumSubLayersInLayerInOLS[ i
                    ][ m ],
                        vps_max_tid_il_ref_pics_plus1[ m ][ k ] )
                    if( vps_direct_ref_layer_flag[ m ][ k ] &&
                    layerIncludedInOlsFlag[ i ][ m ] &&
                        NumSubLayersInLayerInOLS[ i ][ k ] <
                        maxSublayerNeeded )
                        NumSubLayersInLayerInOLS[ i ][ k ] =
                        maxSublayerNeeded
                }
    }
```

For each value of i that is present within a range from 0 to vps_max_layers_minus1, the values of LayerUsedAsRefLayerFlag [i] and LayerUsedAsOutputLayerFlag [i] are both not equal to 0. That is, a layer that is not an output layer of at least one OLS or a layer that is not a direct reference layer of another layer should not be present. One or more layers being an output layer for each OLS should be present. That is, a NumOutputLayersInOls [i] value for an i value that is within a range from 0 to TotalNumOls-1 inclusive should be equal to or greater than 1.

Variable NumLayersInOls [i] indicating a number of layers within an i-th OLS, variable LayerIdInOls [i][j] indicating a nuh_layer_id value of a j-th layer within an i-th OLS, variable NumMultiLayerOlss indicating a number of multi-layer OLSs (i.e., OLSs including two or more layers), and variable MultiLayerOlsIdx [i] indicating an index for a multi-layer OLS list or an i-th OLS when NumLayersInOls [i] is greater than 0 are derived as shown below.

TABLE 4

```
NumLayersInOls[ 0 ] = 1
LayerIdInOls[ 0 ][ 0 ] = vps_layer_id[ 0 ]
NumMultiLayerOlss = 0
for( i = 1; i < TotalNumOlss; i++ ) {
   if( vps each layer is an ols flag ) {
      NumLayersInOls[ i ] = 1
      LayerIdInOls[ i ][ 0 ] = vps_layer_id[ i ]
   } else if( vps_ols_mode_idc = = 0 | | vps_ols_mode_idc = = 1 ) {
      NumLayersInOls[ i ] = i + 1
      for( j = 0; j < NumLayersInOls[ i ]; j++ )
         LayerIdInOls[ i ][ j ] = vps_layer_id[ j ]
   } else if( vps_ols_mode_idc = = 2 ) {
      for( k = 0, j = 0; k <= vps_max_layers_minus1; k++ )
         if( layerIncludedInOlsFlag[ i ][ k ] )
            LayerIdInOls[ i ][ j++ ] = vps_layer_id[ k ]
      NumLayersInOls[ i ] = j
   }
   if( NumLayersInOls[ i ] > 1 ) {
      MultiLayerOlsIdx[ i ] = NumMultiLayerOlss
      NumMultiLayerOlss−+
   }
}
```

A 0-th OLS includes only a lowest layer (i.e., a layer having a nuh_layer_id that is equal to vps_layer_id [0]), and, in case of the 0-th OLS, the only layer that is included is outputted.

Variable OlsLayerIdx [i][j] indicating an OLS layer index of a layer having a nuh_layer_id that is equal to LayerIdInOls [i][j] is derived (or inferred) as shown below.

TABLE 5

```
for( i = 0; i < TotalNumOlss; i++ )
   for j = 0; j < NumLayersInOls[ i ]; j++ )
      OlsLayerIdx[ i ][ LayerIdInOls[ i ][ j ] ] = j
```

The lowest layer of each OLS should be an independent layer. That is, for each value of i of a range from 0 to TotalNumOlss-1 inclusive, a value of vps_independent_layer_flag [GeneralLayerIdx [LayerIdInOls [i][0]]] should be equal to 1.

Each layer should be included in one or more OLSs that is/are indicated by the VPS. That is, one or more pairs of i and j values should be present so that a LayerIdInOls [i][j] value for each layer having a specific nuh_layer_id nuhLayerId that is equal to one of vps_layer_id [k] values for k, which is present in a range from 0 to vps_max_layers_minus1, can be equal to the nuhLayerId. Herein, i is in a range from 0 to TotalNumOlss-1, and j is in a range from 0 to NumLayersInOls [i]-1 inclusive.

vps_num_ptls_minus1+1 indicates a number of profile tier level( ) syntax structures within a VPS. A vps_num_ptls_ minus1 value should be less than TotalNumOlss.

If the value of vps_pt_present_flag [i] is equal to 1, this indicates that profile, tier, and general constraint information are present in an i-th profile tier level( ) syntax structure within the VPS. If the value of vps_pt_present_flag [i] is equal to 0, this indicates that profile, tier, and general constraint information are not present in an i-th profile tier level( ) syntax structure within the VPS. A vps_pt_present_flag [0] value is inferred to be equal to 1. If the vps_pt_present_flag [i] is equal to 0, the profile, tier, and general constraint information of the i-th profile tier level( ) syntax structure within the VPS is derived (or inferred) to be the same as an (i−1)-th profile tier level( ) syntax structure within the VPS.

vps_ptl_max_temporal_id [i] indicates a TemporalId of a highest sublayer representation in which level information is present in the i-th profile tier level( ) syntax structure. The vps_ptl_max_temporal_id [i] value should be within a range of 0 to vps_max_sublayers_minus1. When a vps_ptl_max_temporal_id syntax element is not present in a VPS, the vps_ptl_max_temporal_id [i] value is inferred to be equal to vps_max_sublayers_minus1.

vps_ptl_alignment_zero_bit should be equal to 0.

vps_ols_ptl_idx [i] designates an index of a profile tier level( ) syntax structure that is applied to an i-th OLS for a profile tier level( ) syntax structure list within the VPS. When a vps_ols_ptl_idx syntax element is present in the VPS, the vps_ols_ptl_idx [i] value should be in a range from 0 to vps_num_ptls_minus1 inclusive.

When a vps_ols_ptl_idx syntax element is not present in the VPS, the vps_ols_ptl_idx [i] value is derived (or inferred) as described below.

If the vps_num_ptls_minus1 value is equal to 0, the vps_ols_ptl_idx [i] value is inferred to be equal to 0.

Otherwise (the vps_num_ptls_minus1 value is greater than 0, and vps_num_ptls_minus1+1 is equal to TotalNumOlss), the vps_ols_ptl_idx [i] value is inferred to be equal to i.

If the NumLayersInOls [i] value is equal to 1, a profile tier level( ) syntax structure that is applied to an i-th OLS is also present in an SPS that is referred to by a layer within the i-th OLS. When the NumLayersInOls [i] value is equal to 1, according to a bitstream conformance requirement, a profile tier level( ) syntax structure being signaled in a VPS and a profile tier level( ) syntax structure being signaled in the SPS for the i-th OLS should be the same.

Each profile tier level( ) syntax structure within the VPS should be referred to by at least one vps_ols_ptl_idx [i] value for i of a range from 0 to TotalNumOlss-1 inclusive.

(When present) vps_num_dpb_params_minus1+1 indicates a number of dpb_parameters( ) syntax structures within the VPS. The vps_num_dpb_params_minus1 value should be within a range from 0 to NumMultiLayerOlss-1 inclusive.

Variable VpsNumDpbParams indicating a number of dpb_parameters( ) syntax structures within a VPS is derived (or inferred) as shown below.

TABLE 6

```
if( vps_each_layer_is_an_ols_flag )
   VpsNumDpbParams = 0
```

TABLE 6-continued

```
else
    VpsNumDpbParams = vps_num_dpb_params_minus1 + 1
``` vps_sublayer_dpb_params_present_flag is used for controlling the presence of max_dec_pic_buffering_minus1[ ], max_num_reorder_pics[ ], and max latency increaseplusTh syntax elements in a dpb_parameters( ) syntax element within a VPS. If not present, the vps_sub_dpb_params_info_present_flag value is inferred to be equal to 0.

vps_dpb_max_temporal_id [i] indicates a TemporalId of a highest sublayer representation wherein DPB parameters may be present in an i-th dpb_parameters( ) syntax structure within a VPS. The vps_dpb_max_temporal_id [i] value should be within a range of 0 to vps_max_sublayers_minus1. When not present, the vps_dpb_max_temporal_id [i] value is inferred to be equal to vps_max_sublayers_minus1.

vps_ols_dpb_pic_width [i] indicates a width of each picture storage buffer for an i-th multi-layer OLS in luma sample units.

vps_ols_dpb_pic_height [i] indicates a height of each picture storage buffer for an i-th multi-layer OLS in luma sample units.

vps_ols_dpb_chroma_format [i] indicates a maximum allowable value of sps_chroma_format_idc for all SPSs that are referred to by a CLVS within a CVS for the i-th multi-layer OLS.

vps_ols_dpb_bitdepth_minus8 [i] indicates a maximum allowable value of sps_bit_depth_minus8 for all SPSs that are referred to by a CLVS within a CVS for the i-th multi-layer OLS.

In order to decode an i-th multi-layer OLS, a decoding apparatus may safely allocate a memory to a DPB in accordance with syntax element values of syntax elements vps_ols_dpb_pic_width [i], vps_ols_dpb_pic_height [i], vps_ols_dpb_chroma_format [i], and vps_ols_dpb_bitdepth_ols_dpb_bitdepth_ols_dpb_bitdepth.

vps_ols_dpb_params_idx [i] indicates an index of dpb_parameters( ) syntax structure that is applied to an i-th multi-layer OLS for a dpb_parameters( ) syntax structure list within the VPS. When present, the vps_ols_dpb_params_idx [i] value should be within a range from 0 to VpsNumDpbParams-1 inclusive.

If not present, the vps_ols_dpb_params_idx [i] is inferred as described below.
  When VpsNumDpbParams is equal to 1, the value of vps_ols_dpb_params_idx [i] is equal to 0.
  Otherwise (VpsNumDpbParams is greater than 1 and equal to NumMultiLayerOlss), the vps_ols_dpb_params_idx [i] value is inferred to be equal to i.

In case of a single layer OLS, an applicable dpb_parameters( ) syntax structure is present in an SPS that is referred to by a layer within the OLS.

Each dpb_parameters( ) syntax structure within a VPS should be referred to by at least one vps_ols_dpb_params_idx [i] value for i of a range from 0 to NumMultiLayerOlss-1 inclusive.

If a vps_general_hrd_params_present_flag value is equal to 1, this indicates that the VPS includes a general_hrd_parameters( ) syntax structure and other HRD parameters. If the vps_general_hrd_params_present_flag value is equal to 0, this indicates that the VPS does not include a general_hrd_ parameters( ) syntax structure nor other HRD parameters. When not present, the vps_general_hrd_params_present_flag value is inferred to be equal to 0.

When a value of NumLayersInOls [i] is equal to 1, a general_hrd_parameters( ) syntax structure and an ols_hrd_parameters( ) syntax structure that are applied to an i-th OLS are present in an SPS that is referred to by a layer within the i-th OLS.

If a vps_sublayer_cpb_params_present_flag value is equal to 1, this indicates that an i-th ols_hrd_parameters( ) syntax structure within a VPS includes HRD parameters for sublayer representation having a TemporalId of a range from 0 to vps_hrd_max_tid [i] inclusive. And, if the vps_sublayer_cpb_params_present_flag value is equal to 0, this indicates that an i-th ols_hrd_parameters( ) syntax structure within a VPS includes only HRD parameters for sublayer representation having a TemporalId that is equal to vps_hrd_max_tid [i]. If a vps_max_sublayers_minus1 value is equal to 0, the vps_sublayer_cpb_params_present_flag value is inferred to be equal to 0.

When the vps_sublayer_cpb_params_present_flag value is equal to 0, an HRD parameter for a sublayer representation having a TemporalId of a range from 0 to vps_hrd_max_tid [i]−1 inclusive is inferred to be equal to a sublayer representation having a TemporalId that is equal to vps_hrd_max_tid [i]. This includes HRD parameters starting from a fixed_pic_rate_general_flag [i] syntax element to a sublayer_hrd_parameters (i) syntax structure, which is immediately below an "if (general_vcl_hrd_params_present_flag)" condition within an ols_hrd_parameters syntax structure.

vps_num_ols_hrd_params_minus1 plus 1 indicates a number of ols_hrd_parameters( ) syntax structures that are present within a VPS, when a vps_general_hrd_params_present_flag value is equal to 1. The vps_num_ols_hrd_params_minus1 value should be within a range from 0 to NumMultiLayerOlss−1 inclusive.

vps_hrd_max_tid [i] indicates a TemporalId of a highest sublayer representation having HRD parameters including in an i-th ols_hrd_parameters( ) syntax structure. The value of vps_hrd_max_tid [i] should be within a range of 0 to vps_max_sublayers_minus1. When not present, the vps_hrd_max_tid [i] value is inferred to be equal to vps_max_sublayers_minus1.

vps_ols_hrd_idx [i] indicates an index of a ols_hrd_parameters( ) syntax structure that is applied to an i-th multi-layer OLS for an ols_hrd_parameters( ) syntax structure list within the VPS. The vps_ols_hrd_idx [i] value should be within a range of 0 to vps_num_ols_hrd_params_minus1.

If not present, vps_ols_hrd_idx [i] is inferred (or deduced) as follows.
  If a vps_num_ols_hrd_params_minus1 value is equal to 0, the vps_ols_hrd_idx [i] value is inferred to be equal to 0.
  Otherwise (vps_num_ols_hrd_params_minus1+1 is greater than 1 and equal to NumMultiLayerOlss), the vps_ols_hrd_idx [i] value is inferred to be equal to i.

In case of a single layer OLS, an applicable ols_hrd_parameters( ) syntax structure is present in an SPS that is referred to by a layer within the OLS.

Each ols_hrd_parameters( ) syntax structure within a VPS should be referred to by at least one vps_ols_hrd_idx [i] value for i of a range from 0 to NumMultiLayerOlss-1 inclusive.

If a vps_extension_flag value is equal to 0, this indicates that a vps_extension_data_flag syntax element is not present in a VPS RBSP syntax structure. And, if the vps_extension_flag value is equal to 1, this indicates that a vps_extension_data_flag syntax element is present in a VPS RBSP syntax structure.

The vps_extension_data_flag may have a random value.

In case of a bitstream having a single layer, the presence of a VPS is optional. If a VPS is not present, the value of an sps_video_parameter_set_id syntax element is equal to 0, and part of the parameter values are inferred as described below.

If the value of sps_video_parameter_set_id is equal to 0, the following is applied.
- An SPS does not refer to a VPS, and, when decoding each CLVS that refers to the SPS, reference is not made to the VPS.
- A vps_max_layers_minus1 value is inferred to be equal to 0.
- A vps_max_sublayers_minus1 value is inferred to be equal to 6.
- A CVS should include only one layer (i.e., all VCL NAL units within the CVS should have the same nuh_layer_id value).
- A GeneralLayerIdx [nuh_layer_id] value is inferred to be equal to 0.
- A vps_independent_layer_flag [GeneralLayerIdx [nuh_layer_id]] value is inferred to be equal to 1.

When performing video/image coding, a parameter set (PPS, SPS, VPS, and so on) may be shared among layers. That is, a VCL NAL unit within a specific layer may refer to a parameter set within another layer. When the parameter set sharing function is used, the following constraint exists.

spsLayerId is set to a nuh_layer_id of a specific (or particular) SPS NAL unit, and vclLayerId is set to a nuh_layer_id value of a specific VCL NAL unit. Apart from when spsLayerId is smaller than or not equal to vclLayerId and when, among OLSs that are indicated by a VPS including layers each having a nuh_layer_id that is the same as the vclLayerId, not all OLSs include layers having the same nuh_layer_id as the spslayerId, the specific VCL NAL unit does not refer to the specific SPS NAL unit.

ppsLayerId is set to a nuh_layer_id of a specific PPS NAL unit, and vclLayerId is set to a nuh_layer_id value of a specific VCL NAL unit. Apart from when ppsLayerId is smaller than or not equal to vclLayerId and when, among OLSs that are indicated by a VPS including layers each having a nuh_layer_id that is the same as the vclLayerId, not all OLSs include layers having the same nuh_layer_id as the ppslayerId, the specific VCL NAL unit should not refer to the specific PPS NAL unit.

apsLayerId is set to a nuh_layer_id of a specific APS NAL unit, and vclLayerId is set to a nuh_layer_id value of a specific VCL NAL unit. Apart from when apsLayerId is smaller than or not equal to vclLayerId and when, among OLSs that are indicated by a VPS including layers each having a nuh_layer_id that is the same as the vclLayerId, not all OLSs include layers having the same nuh_layer_id as the apslayerId, the specific VCL NAL unit should not refer to the specific APS NAL unit.

Meanwhile, when a VPS is not present in a CVS (i.e., when the bitstream is a single layer bitstream), all VCL NAL units within the bitstream should have the same nuh_layer_id, and all VCL NAL units should refer to a parameter set within the same layer. However, since such constraint is not included in the aforementioned constraint, additional complexity may occur in case of a decoding apparatus that is designed to handle only single layer bitstreams.

Additionally, when a VPS is not present in a CVS, OLS information is not established. Therefore, part of the parameters that are needed for decoding, such as TotalNumOlss, NumLayersInOls[ ], NumOutputLayersInOls[ ], and so on, are not derived (or inferred) or initialized. This causes problems in the operation of the decoding apparatus.

The following drawings are illustrated in order to describe the detailed example(s) of the present specification. The detailed terms of the apparatus (or device) or the detailed terms of the signal(s)/information specified in the drawings are merely exemplary. And, therefore, the technical characteristics of the present specification will not be limited only to the detailed terms used in the following drawings.

The present specification provides the following methods in order to resolve the above-described problems. The items of each method may be independently applied or may be applied in combination.

For example, when a VPS is not present for a CVS (i.e., when an sps_video_parameter_set_id value is equal to 0), the following constraint may be applied.
- a) A layer identifier (nuh_layer_id) of all VCL NAL units within a CVS that refers to an SPS each has the same value as the layer identifier (nuh_layer_id) of the SPS.
- b) The layer identifier (nuh_layer_id) values of all VCL NAL units are the same as the value of a layer identifier (nuh_layer_id) of a parameter set that is referred to by all of the VCL NAL units.

Herein, a parameter set that is referred to by the VCL NAL units includes a parameter set that is used for decoding video/image information, which is disclosed in the present specification. For example, the parameter set may include APS, PPS, SPS, VPS, and so on.

Alternatively, the aforementioned constraint may be expressed as follows.
- a) All VCL NAL units within a CVS have the same layer identifier (nuh_layer_id) value.
- b) A layer identifier (nuh_layer_id) of a parameter set that is referred to by each VCL NAL unit within the CVS is the same as the layer identifier (nuh_layer_id) of the VCL NAL unit.

Alternatively, the aforementioned constraint may be expressed as follows.
- a) All VCL NAL units within the CVS and parameter set(s) that is/are referred to by the VCL NAL units have the same layer identifier (nuh_layer_id) value.

Alternatively, when the VCL NAL unit refers to a parameter having a layer identifier (nuh_layer_id) that is different from the layer identifier (nuh_layer_id) of a VCL NAL unit, the aforementioned constraint may be expressed (or represented) so that the sps_video_parameter_set_id value is equal to 0.

Additionally, for example, when a VPS is not present for a CVS (i.e., when an sps_video_parameter_set_id value is equal to 0), only one output layer set is present within a CVS, and the output layer set includes only one layer within the CVS, and the layer may be deduced (or inferred) as an output layer of the output layer set.

In case a VPS is not present for a CVS, values of the following parameters may be derived (or inferred) as described below.
- a) TotalNumOlss is inferred to be equal to 1.
- b) NumLayersInOls[0] is inferred to be equal to 1.
- c) NumOutputLayersInOls[0] is inferred to be equal to 1.
- d) OutputLayerIdInOls[0][0] is inferred to be the equal to a nuh_layer_id of an SPS.

According to an embodiment, Table 7 shown below may be applied for an sps_video_parameter_set_id syntax element.

TABLE 7 sps_video_parameter_set_id, when greater than 0, specifies the value of vps_video_parameter_set_id for the VPS referred to by the SPS.
When sps_video_parameter_set_id is equal to 0, the following applies:
- The SPS does not refer to a VPS, and no VPS is referred to

TABLE 7-continued when decoding each CLVS referring to the SPS.
- The value of vps_max_layers_minus1 is inferred to be equal to 0.
- The value of vps max sublayers minus1 is inferred to be equal to 6.
- The CVS shall contain only one layer and all the following applies:
    - nuh_layer_id of all VCL NAL unit in the CVS referring to the SPS shall have the same value as nuh_layer_id of the SPS.
    - The value of the nuh layer id of all VCL NAL units and of the parameter set they refer to shall be the same.
    - The value of vps_independent_layer_flag[ GeneralLayerIdx[ nuh_layer_id ] ] is inferred to be equal to 1.
When vps_independent_layer_flag[ GeneralLayerIdx[ nuh_layer_id ] ] is equal to 1, the SPS referred to by a CLVS with a particluar nuh_layer_id value nuhLayerId shall have nuh_layer_id equal to nuhLayerId.
The value of sps_video_parameter_set_id shall be the same in all SPSs that are referred to by CLVSs in a CVS.

Referring to Table 7, when the value of an sps_video_parameter_set_id syntax element is equal to 0 or more (i.e., when a bitstream including the sps_video_parameter_set_id syntax element is a multi-layer bitstream), the sps_video_parameter_set_id syntax element indicates the value of a vps_video_parameter_set_id syntax element for a VPS that is referred to by an SPS within the corresponding bitstream.

When the sps_video_parameter_set_id syntax element is equal to 0 (i.e., when a bitstream including the sps_video_parameter_set_id syntax element is a single layer bitstream), the corresponding bitstream may not include a VPS. Therefore, an SPS within the corresponding bitstream does not refer to a VPS, and, when decoding each CLVS that refers to the SPS, reference is not made to the VPS.

And, a syntax element (vps_max_layers_minus1) indicating a maximum number of layers within the CVS is deduced (or inferred) to be equal to 0, and the value of a syntax element (vps_max_sublayers_minus1) indicating a number of temporal sublayers that may be present in a CVS is inferred to be equal to 6.

Additionally, when the value of the sps_video_parameter_ set_id syntax element is equal to 0, the CVS includes only one layer, and the following is applied to the CVS.

The values of the nuh_layer_id syntax elements of all VCL NAL units referring to an SPS that refers to the CVS are the same as the value of the nuh_layer_id syntax element of the SPS.

The values of the nuh_layer_id syntax elements of all VCL NAL units within the CVS and a value of a nuh_layer_id syntax element of a parameter set that is referred to by the VCL NAL units are the same.

Herein, the parameter set may include APS, PPS, SPS, VPS, and so on. Therefore, when only one layer is included in the CVS, nuh_layer_id of the APS (apsLayerId), nuh_layer_id of the PPS (ppsLayerId), nuh_layer_id of the SPS (spsLayerId), and nuh_layer_id (vps_layer_id) of the VPS are the same as nuh_layer_id of the VCL NAL units.

Additionally, the value of a syntax element related to inter layer prediction (vps_independent_layer_flag [GeneralLayerIdx [nuh_layer_id]]) is inferred to be equal to 1. That is, inter layer prediction is not used.

When the value of a vps_independent_layer_flag [GeneralLayerIdx [nuh_layer_id]] is equal to 1, an SPS that is referred to by a CLVS having a nuhLayerId of a specific nuh_layer_id value has the same nuh_layer_id as the nuhLayerId.

The value of the sps_video_parameter_set_id is the same for all SPSs being referred to by a CLVS within the CVS.

According to another embodiment, Table 8 shown below may be applied for an sps_video_parameter_set_id syntax element.

TABLE 8 sps_video_parameter_set_id, when greater than 0, specifies the value of vps_video_parameter_set_id for the VPS referred to by the SPS.
When sps_video_parameter_set_id is equal to 0, the following applies:
- The SPS does not refer to a VPS, and no VPS is referred to when decoding each CLVS referring to the SPS.
- The value of vps_max_layers_minus1 is inferred to be equal to 0.
- The value of vps_max_sublayers_minus1 is inferred to be equal to 6.
- The CVS shall contain only one layer and all the following applies:
    - All VCL NAL unit in the CVS shall have the same value of nuh_layer_id.
    - The nuh_layer_id of the parameter sets referred to by each VCL NAL unit in the CVS shall be the same as the nuh_layer_id of the VCL NAL unit.
    - The value of vps_independent_layer_flag[ GeneralLayerIdx[ nuh_layer_id ] ] is inferred to be equal to 1.
When vps_independent_layer_flag[ GeneralLayerIdx[ nuh_layer_id ] ] is equal to 1, the SPS referred to by a CLVS with a particluar nuh_layer_id value nuhLayerId shall have nuh_layer_id equal to nuhLayerId.
The value of sps_video_parameter_set_id shall be the same in all SPSs that are referred to by CLVSs in a CVS.

Referring to Table 8, when the value of an sps_video_parameter_set_id syntax element is equal to 0 or more, the sps_video_parameter_set_id syntax element indicates the value of a vps_video_parameter_set_id syntax element for a VPS that is referred to by an SPS within the corresponding bitstream.

When the sps_video_parameter_set_id syntax element is equal to 0, an SPS within the corresponding bitstream does not refer to a VPS, and, when decoding each CLVS that refers to the SPS, reference is not made to the VPS.

And, a syntax element (vps_max_layers_minus1) indicating a maximum number of layers within the CVS is deduced (or inferred) to be equal to 0, and the value of a syntax element (vps_max_sublayers_minus1) indicating a number of temporal sublayers that may be present in a CVS is inferred to be equal to 6.

Additionally, when the value of the sps_video_parameter_ set_id syntax element is equal to 0, the CVS includes only one layer, and the following is applied to the CVS.

All VCL NAL units within the CVS have the same nuh_layer_id value.

The nuh_layer_id of a parameter set that is referred to by each VCL NAL unit within the CVS is the same as the nuh_layer_id of the VCL NAL unit.

Additionally, the value of a syntax element related to inter layer prediction (vps_independent_layer_flag [GeneralLayerIdx [nuh_layer_id]]) is inferred to be equal to 1.

When the value of a vps_independent_layer_flag [GeneralLayerIdx [nuh_layer_id]] is equal to 1, an SPS that is referred to by a CLVS having a nuhLayerId of a specific nuh_layer_id value has the same nuh_layer_id as the nuhLayerId.

The value of the sps_video_parameter_set_id is the same for all SPSs being referred to by a CLVS within the CVS.

According to yet another embodiment, Table 9 shown below may be applied for an sps_video_parameter_set_id syntax element.

TABLE 9 sps_video_parameter_set_id, when greater than 0, specifies the value of vps_video_parameter_set_id for the VPS referred to by the SPS.
When sps_video_parameter_set_id is equal to 0, the following applies:
- The SPS does not refer to a VPS, and no VPS is referred to when decoding each CLVS referring to the SPS.
- The value of vps_max_layers_minus1 is inferred to be equal to 0.
- The value of vps_max_sublayers_minus1 is inferred to be equal to 6.
- The CVS shall contain only one layer and all the following applies:
  - All VCL NAL unit in the CVS and the parameter sets they referred to shall have the same value of nuh_layer_id.
- The value of vps_independent_layer_flag[ GeneralLayerIdx[ nuh_layer_id ] ] is inferred to be equal to 1.
When vps_independent_layer_flag[ GeneralLayerIdx[ nuh_layer_id ] ] is equal to 1, the SPS referred to by a CLVS with a particluar nuh_layer_id value nuhLayerId shall have nuh_layer_id equal to nuhLayerId.
The value of sps_video_parameter_set_id shall be the same in all SPSs that are referred to by CLVSs in a CVS.

Referring to Table 9, when the value of an sps_video_parameter_set_id syntax element is equal to 0 or more, the sps_video_parameter_set_id syntax element indicates the value of a vps_video_parameter_set_id syntax element for a VPS that is referred to by an SPS within the corresponding bitstream.

When the sps_video_parameter_set_id syntax element is equal to 0, an SPS within the corresponding bitstream does not refer to a VPS, and, when decoding each CLVS that refers to the SPS, reference is not made to the VPS.

And, a syntax element (vps_max_layers_minus1) indicating a maximum number of layers within the CVS is deduced (or inferred) to be equal to 0, and the value of a syntax element (vps_max_sublayers_minus1) indicating a number of temporal sublayers that may be present in a CVS is inferred to be equal to 6.

Additionally, when the value of the sps_video_parameter_ set_id syntax element is equal to 0, the CVS includes only one layer, and all VCL NAL units within the CVS and the parameter sets that are referred to by the VCL NAL units have the same nuh_layer_id value.

Additionally, the value of a syntax element related to inter layer prediction (vps_independent_layer_flag [GeneralLayerIdx [nuh_layer_id]]) is inferred to be equal to 1.

When the value of a vps_independent_layer_flag [GeneralLayerIdx [nuh_layer_id]] is equal to 1, an SPS that is referred to by a CLVS having a nuhLayerId of a specific nuh_layer_id value has the same nuh_layer_id as the nuhLayerId.

The value of the sps_video_parameter_set_id is the same for all SPSs being referred to by a CLVS within the CVS.

As yet another embodiment, when only one layer is included in the CVS, the following constraint may be applied as shown below in Table 10.

TABLE 10

Let spsLayerId be the value of the nuh_layer_id of a particular SPS NAL unit, and vclLayerId be the value of the nuh_layer_id of a particular VCL
NAL unit. The particular VCL NAL unit shall not refer to the particular SPS NAL unit unless spsLayerId is less than or equal to vclLayerId, the value of sps_video_parameter_set_id is not equal to 0, and all OLSs specified by the VPS that contain the layer with nuh_layer_id equal to vclLayerId also contain the layer with nuh_layer_id equal to spsLayerId.
Let ppsLayerId be the value of the nuh_layer_id of a particular PPS NAL TABLE 10-continued unit, and vclLayerId be the value of the nuh_layer_id of a particular VCL
NAL unit. The particular VCL NAL unit shall not refer to the particular PPS NAL unit unless ppsLayerId is less than or equal to vclLayerId, the value of sps_video_parameter_set_id is not equal to 0, and all OLSs specified by the VPS that contain the layer with nuh_layer_id equal to vclLayerId also contain the layer with nuh_layer_id equal to ppslayerId.
Let apsLayerId be the value of the nuh_layer_id of a particular APS NAL
unit, and vclLayerId be the value of the nuh_layer_id of a particular VCL
NAL unit. The particular VCL NAL unit shall not refer to the particular APS NAL unit unless apsLayerId is less than or equal to vclLayerId, the value of sps_video_parameter_set_id is not equal to 0, and all OLSs specified by the VPS that contain the layer with nuh_layer_id equal to vclLayerId also contain the layer with nuh_layer_id equal to apsLayerId.

That is, spsLayerId is set to a nuh_layer_id of a specific (or particular) SPS NAL unit, and vclLayerId is set to a nuh_layer_id value of a specific VCL NAL unit. Apart from when spsLayerId is smaller than or not equal to vclLayerId, when the sps_video_parameter_set_id value is not equal to 0, and when, among OLSs that are indicated by a VPS including layers each having a nuh_layer_id that is the same as the vclLayerId, not all OLSs include layers having the same nuh_layer_id as the spslayerId, the specific VCL NAL unit does not refer to the specific SPS NAL unit.

ppsLayerId is set to a nuh_layer_id of a specific PPS NAL unit, and vclLayerId is set to a nuh_layer_id value of a specific VCL NAL unit. Apart from when ppsLayerId is smaller than or not equal to vclLayerId, when the sps_video_parameter_set_id value is not equal to 0, and when, among OLSs that are indicated by a VPS including layers each having a nuh_layer_id that is the same as the vclLayerId, not all OLSs include layers having the same nuh_layer_id as the ppslayerId, the specific VCL NAL unit should not refer to the specific PPS NAL unit.

apsLayerId is set to a nuh_layer_id of a specific APS NAL unit, and vclLayerId is set to a nuh_layer_id value of a specific VCL NAL unit. Apart from when apsLayerId is smaller than or not equal to vclLayerId and when, among OLSs that are indicated by a VPS including layers each having a nuh_layer_id that is the same as the vclLayerId, not all OLSs include layers having the same nuh_layer_id as the apslayerId, the specific VCL NAL unit should not refer to the specific APS NAL unit.

Additionally, when only one layer is included in the CVS, the following constraint may be applied as shown below in Table 11.

TABLE 11

When sps_video_parameter_set_id is equal to 0, the following applies:
- The SPS does not refer to a VPS, and no VPS is referred to when decoding each CLVS referring to the SPS.
- The value of vps_max_layers_minus1 is inferred to be equal to 0.
- The value of vps_max_sublayers_minus1 is inferred to be equal to 6.
- The CVS shall contain only one layer (i.e., all VCL NAL unit in the CVS shall have the same value of nuh_layer_id).
- The value of TotalNumOlss is inferred to be equal to 1.
- The value of NumLayersInOls[ 0 ] is inferred to be equal to 1.
- The value of NumOutputLayersInOls[ 0 ] is inferred to be equal to 1.
- The value of OutputLayerIdInOls[ 0 ][ 0 ] is inferred to be equal to 1.
- The value of GeneralLayerIdx[ nuh_layer_id ] is inferred to be equal to nuh_layer_id.
- The value of vps_independent_layer_flag[ GeneralLayerIdx[ nuh_layer_id ] ] is inferred to be equal to 1.
When vps_independent_layer_flag[ GeneralLayerIdx[ nuh_layer_id ] ]

TABLE 11-continued is equal to 1, the SPS referred to by a CLVS with a particular nuh_layer_id value nuhLayerId shall have nuh_layer_id equal to nuhLayerId.
The value of sps_video_parameter_set_id shall be the same in all SPSs that are referred to by CLVSs in a CVS.

Referring to Table 11, when the sps_video_parameter_set_id syntax element is equal to 0, an SPS within the corresponding bitstream does not refer to a VPS, and, when decoding each CLVS that refers to the SPS, reference is not made to the VPS.

Additionally, a syntax element (vps_max_layers_minus1) indicating a maximum number of layers within the CVS is deduced (or inferred) to be equal to 0, and the value of a syntax element (vps_max_sublayers_minus1) indicating a number of temporal sublayers that may be present in a CVS is inferred to be equal to 6.

Additionally, the CVS includes only one layer, and the following is applied to the CVS. That is, all VCL NAL units within the CVS have the same nuh_layer_id value.

Additionally, TotalNumOlss indicating a total number of OLSs that are specified by a VPS is inferred to be equal to 1, and NumLayersInOls[0] indicating a number of layers within a 0-th OLS is inferred to be equal to 1.

Additionally, NumOutputLayersInOls[0] indicating a number of output layers within a 0-th OLS is inferred to be equal to 1, and OutputLayerIdInOls[0][0] indicating a nuh_layer_id value of a 0-th output layer within the 0-th OLS is inferred to be equal to 1.

Additionally, a GeneralLayerIdx[nuh_layer_id] value is inferred to be equal to nuh_layer_id, and a vps_independent_layer_flag [GeneralLayerIdx[nuh_layer_id]] value is inferred to be equal to 1. When the vps_independent_layer_flag [GeneralLayerIdx[nuh_layer_id]] value is equal to 1, an SPS that is referred to by a CLSV having a nuhLayerId of a specific nuh_layer_id value has the same nuh_layer_id as the nuhLayerId.

The sps_video_parameter_set_id value is the same in all SPSs being referred to by the CLVS within the CVS.

Meanwhile, variable PictureOutputFlag of a current picture may be derived (or inferred) as described below.

When a current layer is not an output layer (i.e., when the nuh_layer_id is not the same as OutputLayerIdInOls [TargetOlsIdx][i] for an i value within a range from 0 to NumOutputLayersInOls[TargetOlsIdx]-1 inclusive), or when one of the following conditions is true, PictureOutputFlag is set to be equal to 0.

The current picture is an RASL picture, and NoOutputBeforeRecoveryFlag of a related TRAP picture is equal to 1.

The current picture is a GDR picture having NoOutputBeforeRecoveryFlag that is equal to 1, or the current picture is a reconstructed picture of a GDR picture having NoOutputBeforeRecoveryFlag that is equal to 1.

Otherwise, PictureOutputFlag is set to be the same as ph_pic_output_flag.

Meanwhile, the decoding apparatus may output a picture that does not belong to an output layer. For example, while an AU is incapable of using a picture of an output layer, when there is only one output layer (e.g., due to a loss or layer down-switching), among all pictures of the AU that are available for usage, the decoding apparatus may set the PictureOutputFlag to 1 for a picture having the highest nuh_layer_id value and a ph_pic_output_flag that is equal to 1. For all of the other pictures of the AU that are available for usage, the decoding apparatus may set the PictureOutputFlag to 0.

Figure 9:
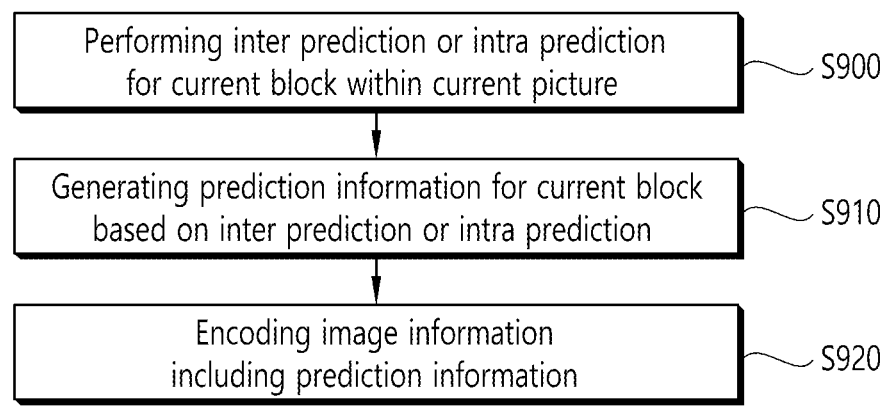
FIG. 9 and FIG. 10 respectively show general examples of a video/image encoding method and a related component according to an embodiment of the present disclosure.
Figure 10:
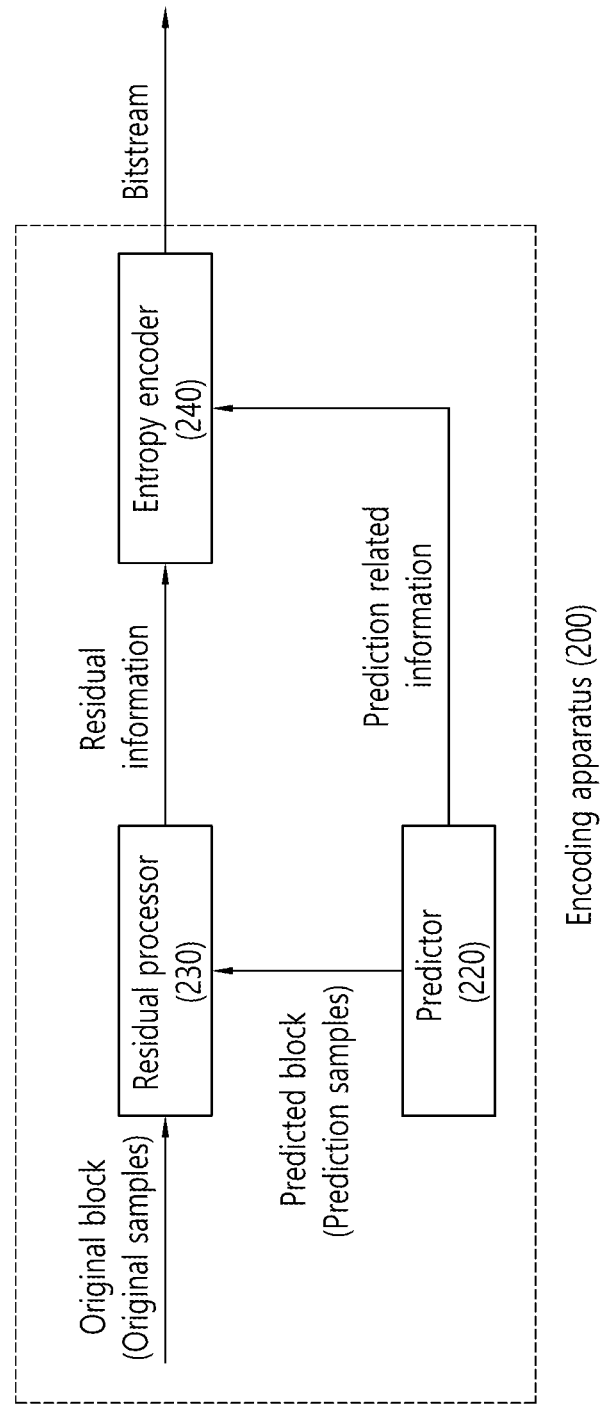

FIG. 9 and FIG. 10 respectively show general examples of a video/image encoding method and a related component according to an embodiment of the present disclosure.

The video/image encoding method disclosed in FIG. 9 may be performed by a(n) (video/image) encoding apparatus 200 that is disclosed in FIG. 2, FIG. 3, and FIG. 10. More specifically, for example, S900 and S910 of FIG. 9 may be performed by the predictor 220 of the encoding apparatus 200, and S920 may be performed by the entropy encoder 240 of the encoding apparatus 200. The video/image encoding method disclosed in FIG. 9 may include the embodiments that are described above in the present specification.

More specifically, referring to FIG. 9 and FIG. 10, the predictor 220 of the encoding apparatus may perform at least one of inter predictor or intra prediction on a current block within a current picture (S900) and, then, generate prediction samples (prediction block) and prediction information on the current block based on the prediction (S910).

When intra prediction is performed, the predictor 220 may predict the current block by referring to samples within the current picture (neighboring samples of the current block). The predictor 220 may determine a prediction mode that is to be applied to the current block by using a prediction mode that is applied to the neighboring samples.

When inter prediction is performed, the predictor 220 may generate prediction information and a block that is predicted for the current block by performing inter prediction based on motion information of the current block. The above-described prediction information may include information related to a prediction mode, information related to motion information, and so on. The information related to the motion information may include candidate selection information (e.g., merge index, mvp flag or mvp index), which is information for deriving a motion vector. Additionally, the information related to the motion information may include the above-described information on a motion vector difference (MVD) and/or reference picture index information. Additionally, the information related to the motion information may include information indicating whether L0 prediction, L1 prediction, or bi-prediction is applied. For example, the predictor 220 may derive motion information of the current block within the current picture based on motion estimation. For this, by using an original block within an original picture corresponding to the current block, the predictor 220 may search a similar reference block having a high correlation in fractional pixel units within a determined search range within a reference picture. And, then, the predictor 220 may derive motion information through the searched reference block. The similarity of a block may be derived based on a difference between phase-based sample values. For example, the similarity of a block may be calculated based on a Sum of Absolute Difference (SAD) between a current block (or current block template) and a reference block (or reference block template). In this case, motion information may be derived based on a reference block having a smallest SAD within the search region. The derived motion information may be signaled to a decoding apparatus by using various methods based on the inter prediction mode.

The residual processor 230 of the encoding apparatus may generate residual samples and residual information based on prediction samples generated from the predictor 220 and an original picture (original block, original samples). Herein, the residual information is information related to the residual samples, and the residual information may include information related to (quantized) transform coefficients for the residual samples.

The adder (or reconstructor) of the encoding apparatus may generate reconstructed samples (reconstructed picture, reconstructed block, reconstructed sample array) by adding the residual samples that are generated in the residual processor 230 and the prediction samples that are generated in the predictor 220.

The entropy encoder 240 of the encoding apparatus may encode image information including prediction information that is generated in the predictor 220, residual information that is generated in the residual processor 230, and so on (S920). Herein, the image information may further include information on the VCL NAL units and information on HLS and may be delivered (or transferred) to the decoding apparatus in a bitstream format. A bitstream is a bit sequence being configured in the form of a NAL unit stream or byte stream that forms expressions of an access unit (AU) forming one or more CVS. In case of a single-layer bitstream, the bitstream may be formed of one CVS, and, in this case, the CVS may be used as the same meaning as a bitstream.

The information related to the HLS may include information/syntax related to a parameter set that is used for decoding image/video information. For example, the parameter set may include APS, PPS, SPS, VPS, and so on. The SPS may include an sps_video_parameter_set_id syntax element.

In the present embodiment, layer identifiers of VCL NAL units included in a bitstream and a layer identifier of a parameter set that is referred to by the VCL NAL units may be derived based on a value of the sps_video_parameter_set_id syntax element.

For example, when the value of the sps_video_parameter_set_id syntax element is greater than 0, i.e., when the sps_video_parameter_set_id syntax element value is not equal to 0, the sps_video_parameter_set_id syntax element may indicate a value of an identifier for a VPS that is being referred to an SPS (vps_video_parameter_set_id syntax element).

When the value of the sps_video_parameter_set_id syntax element is equal to 0, values of a nuh_layer_id syntax element of all VCL NAL units of an SPS within the CVS may be equal to the value of a nuh_layer_id syntax element of the SPS. And, the values of the nuh_layer_id syntax element of the VCL NAL units may be equal to the values of the nuh_layer_id syntax element of a parameter set being referred to by the VCL NAL units.

Alternatively, when the sps_video_parameter_set_id syntax element value is equal to 0, all VLS NAL units within the CVS may have the same NAL unit header layer identifier (nuh_layer_id) value, and a NAL unit header layer identifier (nuh_layer_id) of a parameter set that is referred to by each VCL NAL unit within the CVS may be the same as the NAL unit header layer identifier (nuh_layer_id) of the VCL NAL unit.

Alternatively, when the sps_video_parameter_set_id syntax element value is equal to 0, all VCL NAL units within the CVS and the parameter sets that are referred to by the VCL NAL units have the same NAL unit header layer identifier (nuh_layer_id).

Additionally, according to the present embodiment, information related to OLS may be derived based on a value of the sps_video_parameter_set_id syntax element. The information related to OLS may include the above-described TotalNumOlss, NumLayersInOls[i], NumOutputLayersInOls[i], OutputLayerIdInOls[i][j], and so on. Herein, TotalNumOlss indicates a total number of OLSs being specified by a video parameter set. NumLayersInOls[i] indicates a number of layers within an i-th OLS. NumOutputLayersInOls[i] indicates a number of output layers within an i-th OLS. OutputLayerIdInOls[i][j] indicates the value of a layer identifier (nuh_layer_id) of a NAL unit header of a j-th output layer within an i-th OLS.

For example, when the sps_video_parameter_set_id syntax element value is equal to 0, the value of at least one of TotalNumOlss, NumLayersInOls[0], NumOutputLayersInOls[0], and OutputLayerIdInOls[0][0] may be inferred to be equal to 1. Additionally, a GeneralLayerIdx[nuh_layer_id] value may be inferred to be the same as nuh_layer_id.

Therefore, according to the present specification, even in case of a single layer bitstream in which a VSP is not present in a CVS, since a layer identifier of a VPS that is referred to by the VCL NAL units may be derived (or inferred), coding efficiency in a decoding apparatus that is designed to handle only single layer bitstreams may be increased. Moreover, even if a VPS is not present in a CVS, since information related to OLS may be derived (or inferred) or initialized, problems that may occur during the decoding process, in a case where a VPS is not present in a CVS, may be prevented.

Figure 11:
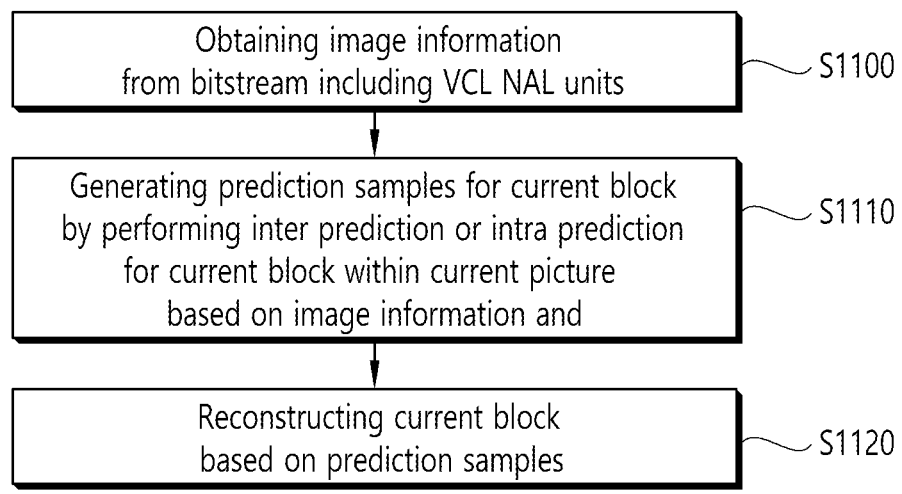
FIG. 11 and FIG. 12 respectively show general examples of a video/image decoding method and a related component according to an embodiment of the present disclosure.
Figure 12:
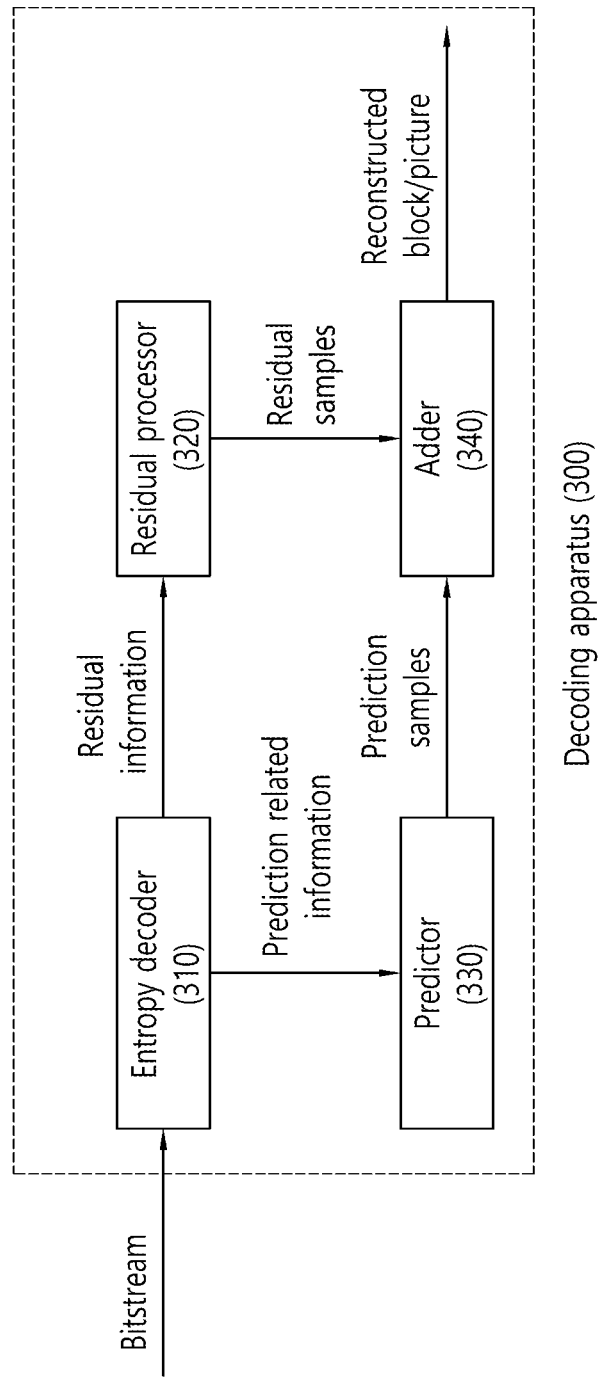

FIG. 11 and FIG. 12 respectively show general examples of a video/image decoding method and a related component according to an embodiment of the present disclosure.

The video/image decoding method disclosed in FIG. 11 may be performed by a (video/image) decoding apparatus 300 that is disclosed in FIG. 4, FIG. 5, and FIG. 12. More specifically, for example, S1100 of FIG. 11 may be performed by the entropy decoder 310 of the decoding apparatus. S1110 may be performed by the predictor 330 of the decoding apparatus, and S1120 may be performed by the adder 340 of the decoding apparatus. The video/image decoding method disclosed in FIG. 11 may include the embodiments that are described above in the present specification.

Referring to FIG. 11 and FIG. 12, the entropy decoder 310 of the decoding apparatus may obtain image information from a bitstream including VCL NAL units (S1100). Apart from the information related to the VCL NAL units, the image information may further include prediction information, residual information, information related to HLS, information related to in-loop filtering, and so on. The prediction information may include inter/intra prediction differentiation information, intra prediction mode related information, inter prediction mode related information, and so on. The information related to HLS may include may include information/syntax related to a parameter set that is used for decoding image/video information. Herein, the parameter set may include APS, PPS, SPS, VPS, and so on. The SPS may include an sps_video_parameter_set_id syntax element.

The entropy decoder 310 of the decoding apparatus may derive (or infer) layer identifiers of the VCL NAL units, layer identifiers of parameter sets that are referred to by the VCL NAL units, and/or information related to OLS based on the sps_video_parameter_set_id syntax element value.

For example, when the value of the sps_video_parameter_set_id syntax element that is parsed from a bitstream is greater than 0, the entropy decoder 310 of the decoding apparatus may derive (or infer) the sps_video_parameter_set_id syntax element value to be equal to the value of an identifier for VPS (vps_video_parameter_set_id syntax element) that is referred to by an SPS. However, if the sps_video_parameter_set_id syntax element value is equal to 0, the entropy decoder 310 of the decoding apparatus may derive (or infer) values of nuh_layer_id syntax elements of all VCL NAL units of an SPS within a CVS to be the same as values of the nuh_layer_id syntax elements of the SPS, and the values of the nuh_layer_id syntax elements of the VCL NAL units and the values of the nuh_layer_id syntax elements of the parameter sets that are referred to by the VCL NAL units may be derived (or inferred) to be the same.

As another example, if the value of the sps_video_parameter_set_id syntax element that is parsed from a bitstream is greater than 0, the entropy decoder 310 of the decoding apparatus may derive (or infer) all VLS NAL units within the CVS to be the same as the NAL unit header layer identifier (nuh_layer_id) value, and a NAL unit header layer identifier (nuh_layer_id) of a parameter set that is referred to by each VCL NAL unit within the CVS may be derived (or inferred) to be the same as the NAL unit header layer identifier (nuh_layer_id) of the VCL NAL unit.

As yet another example, if the value of the sps_video_parameter_set_id syntax element that is parsed from a bitstream is greater than 0, the entropy decoder 310 of the decoding apparatus may derive (or infer) all VCL NAL units within the CVS and the parameter sets that are referred to by the VCL NAL units to have the same NAL unit header layer identifier (nuh_layer_id).

Additionally, the entropy decoder 310 of the decoding apparatus may derive information related to OLS based on a value of the sps_video_parameter_set_id syntax element that is parsed from the bitstream. The information related to OLS may include TotalNumOlss indicating a total number of OLSs being specified by a video parameter set, NumLayersInOls[i] indicating a number of layers within an i-th OLS, NumOutputLayersInOls[i] indicating a number of output layers within an i-th OLS, and OutputLayerIdInOls[i][j] indicating the value of a layer identifier (nuh_layer_id) of a NAL unit header of a j-th output layer within an i-th OLS.

For example, if the value of the sps_video_parameter_set_id syntax element that is parsed from a bitstream is equal to 0, the value of at least one of TotalNumOlss, NumLayersInOls[0], NumOutputLayersInOls[0], and OutputLayerIdInOls[0][0] may be inferred to be equal to 1. Additionally, a GeneralLayerIdx[nuh_layer_id] value may be inferred to be the same as nuh_layer_id.

More specifically, the predictor 330 of the decoding apparatus may perform inter prediction and/or intra prediction for a current block within a current picture based on prediction information that is obtained from a bitstream so as to generate prediction samples for the current block (S1110). Thereafter, the residual processor 320 of the decoding apparatus may generate residual samples based on residual information that is obtained from the bitstream. The adder 340 of the decoding apparatus may generate reconstructed samples based on the prediction samples that are generated in the predictor 330 and the residual samples that are generated in the residual processor 320 and may, then, generate a reconstructed picture (reconstructed block) based on the reconstructed samples (S1120).

Thereafter, an in-loop filtering procedure, such as deblocking filtering, SAO, and/or ALF procedures, may be applied to the reconstructed picture as needed, in order to enhance subjective/objective picture quality.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present document may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 13:
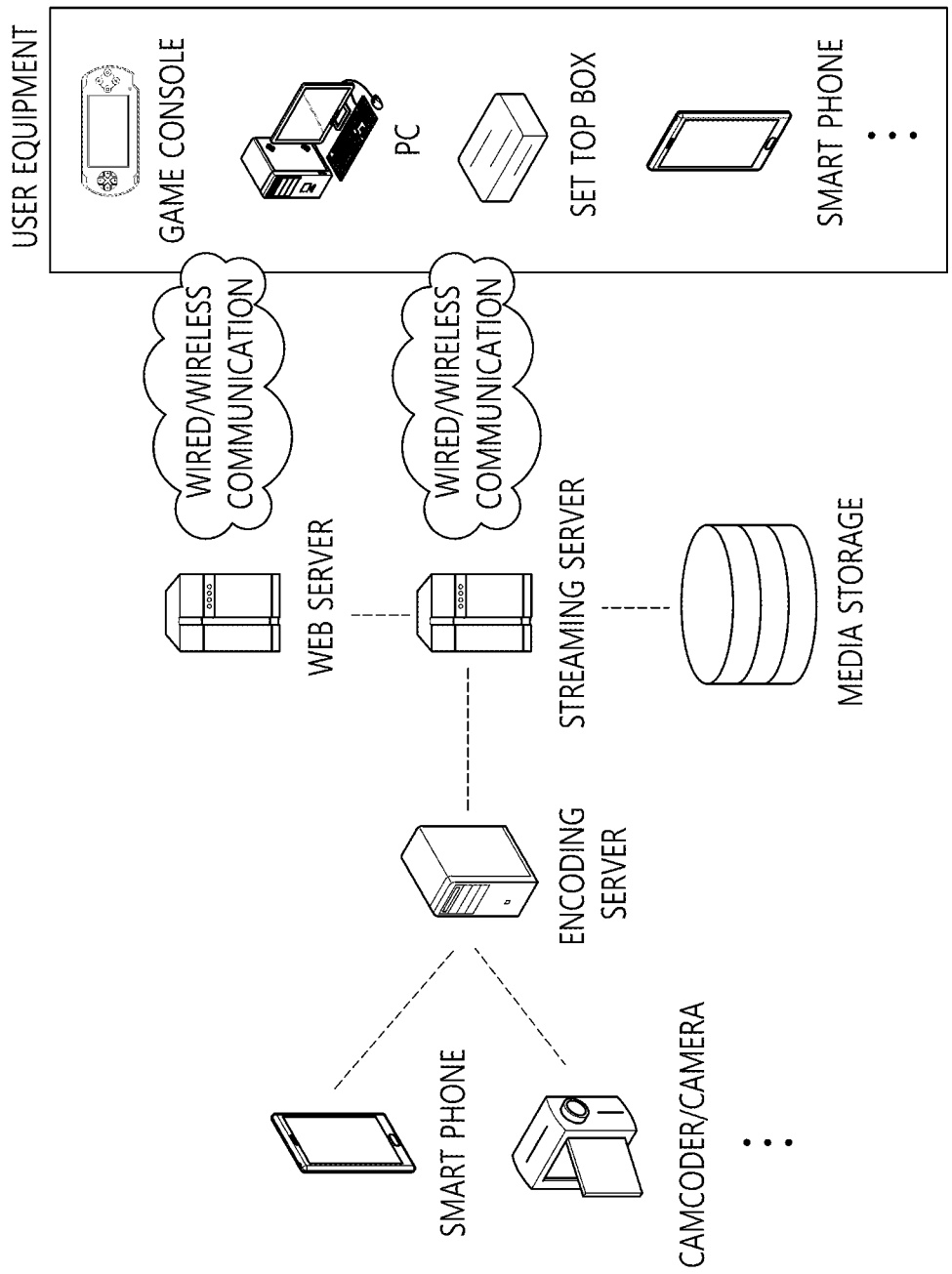
FIG. 13 shows an example of a contents streaming system to which the embodiment of the present disclosure may be applied.

FIG. 13 represents an example of a contents streaming system to which the embodiment of the present document may be applied.

Referring to FIG. 13, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case in which the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. A video decoding method performed by a video decoding apparatus, the method comprising:

obtaining image information including video coding layer (VCL) network abstraction layer (NAL) units from a bitstream;

generating prediction samples for a current block by performing an inter prediction or an intra prediction for the current block within a current picture based on the image information; and reconstructing the current block based on the prediction samples, wherein the image information includes an sps_video_parameter_set_id syntax element, and wherein, based on a value of the sps_video_parameter_set_id syntax element being equal to 0, i) a value related to a maximum number of allowed layers within each coded video sequence (CVS) is inferred to be equal to 0 and ii) a value of a total number of output layer sets (OLSs) that are specified by the video parameter set is inferred to be equal to 1, and wherein based on a value of the sps_video_parameter_set_id syntax element being equal to 0, a value of a number of layers within the 0-th OLS is inferred to be equal to 1 without referencing a parameter specifying whether at least one OLS includes one or more layers.

2. The video decoding method of claim 1, wherein the bitstream is a single layer bitstream.

3. The video decoding method of claim 1, wherein, based on the value of the sps_video_parameter_set_id syntax element being equal to 0, a number of output layers within the OLS is inferred to be equal to 1.

4. The video decoding method of claim 1, wherein layer identifiers of the VCL NAL units and layer identifiers of parameter sets being referred to by the VCL NAL units are inferred based on the value of the sps_video_parameter_set_id syntax element.

5. The video decoding method of claim 1, wherein the parameter set includes at least one of a picture parameter set, a sequence parameter set, or a video parameter set.

6. The video decoding method of claim 5, wherein, based on the value of the sps_video_parameter_set_id syntax element being equal to 0, values of nuh_layer_id syntax elements of all VCL NAL units that are referred to by the sequence parameter set are the same as a value of a nuh_layer_id syntax element of the sequence parameter set.

7. The video decoding method of claim 5, wherein, based on the value of the sps_video_parameter_set_id syntax element being greater than 0, the sps_video_parameter_set_id syntax element indicates a value of a vps_video_parameter_set_id syntax element for a video parameter set that is referred to by the sequence parameter set.

8. The video decoding method of claim 4, wherein, based on the value of the sps_video_parameter_set_id syntax element being equal to 0, values of nuh_layer_id syntax elements of the VCL NAL units and a value of a nuh_layer_id syntax element of the parameter set are the same.

9. The video decoding method of claim 1, wherein, based on the value of the sps_video_parameter_set_id syntax element being equal to 0, a layer identifier of a NAL unit header of a parameter set that is referred to by each VCL NAL unit within the image information are the same as a layer identifier of a NAL unit header of the VCL NAL unit.

10. The video decoding method of claim 1, wherein, based on a VCL NAL unit within the VCL NAL units referring to a parameter set having a layer identifier that is different from the layer identifier of the VCL NAL unit, the value of the sps_video_parameter_set_id syntax element is inferred to be equal to 0.

11. A video encoding method performed by a video encoding apparatus, the method comprising:

performing an inter prediction or an intra prediction for a current block within a current picture;

generating prediction information for the current block based on the inter prediction or the intra prediction; and encoding image information including the prediction information, wherein the image information includes video coding layer (VCL) network abstraction layer (NAL) units and an sps_video_parameter_set_id syntax element, and wherein, based on a value of the sps_video_parameter_set_id syntax element being equal to 0, i) a value related to a maximum number of allowed layers within each coded video sequence (CVS) is inferred to be equal to 0 and ii) a value of a total number of output layer sets (OLSs) that are specified by the video parameter set is inferred to be equal to 1, and wherein based on a value of the sps_video_parameter_set_id syntax element being equal to 0, a value of a number of layers within the 0-th OLS is inferred to be equal to 1 without referencing a parameter specifying whether at least one OLS includes one or more layers.

12. The video encoding method of claim 11, wherein the image information includes only one layer.

13. The video encoding method of claim 11, wherein layer identifiers of the VCL NAL units and layer identifiers of parameter sets being referred to by the VCL NAL units are inferred based on the value of the sps_video_parameter_set_id syntax element.

14. The video encoding method of claim 13, wherein, based on the value of the sps_video_parameter_set_id syntax element being equal to 0, values of nuh_layer_id syntax elements of the VCL NAL units and a value of a nuh_layer_id syntax element of the parameter set are the same.

15. A non-transitory computer readable digital recording medium for storing a bitstream generated by the video encoding method of claim 11.

16. A method for transmitting data for image information comprising:

performing an inter prediction or an intra prediction for a current block within a current picture;

generating prediction information for the current block based on the inter prediction or the intra prediction; and encoding the image information including the prediction information, wherein the image information includes video coding layer (VCL) network abstraction layer (NAL) units and an sps_video_parameter_set_id syntax element, and wherein, based on a value of the sps_video_parameter_set_id syntax element being equal to 0, i) a value related to a maximum number of allowed layers within each coded video sequence (CVS) is inferred to be equal to 0 and ii) a value of a total number of output layer sets (OLSs) that are specified by the video parameter set is inferred to be equal to 1, and wherein based on a value of the sps_video_parameter_set_id syntax element being equal to 0, a value of a number of layers within the 0-th OLS is inferred to be equal to 1 without referencing a parameter specifying whether at least one OLS includes one or more layers.

* * * * *